(12) United States Patent
Washio

(10) Patent No.: US 10,731,756 B2
(45) Date of Patent: Aug. 4, 2020

(54) CONTROL APPARATUS FOR VEHICLE

(71) Applicant: TOYOTA JIDOSHA KABUSHIKI KAISHA, Toyota-shi, Aichi-ken (JP)

(72) Inventor: Taichi Washio, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 16/267,663

(22) Filed: Feb. 5, 2019

(65) Prior Publication Data

US 2019/0242475 A1 Aug. 8, 2019

(30) Foreign Application Priority Data

Feb. 7, 2018 (JP) ................................. 2018-020367

(51) Int. Cl.
*F16H 61/02* (2006.01)
*F16H 61/662* (2006.01)
*F16H 61/66* (2006.01)

(52) U.S. Cl.
CPC ..... *F16H 61/6625* (2013.01); *F16H 61/0276* (2013.01); *F16H 2061/0281* (2013.01); *F16H 2061/6609* (2013.01)

(58) Field of Classification Search
None
See application file for complete search history.

(56) References Cited

U.S. PATENT DOCUMENTS 9,097,315 B2 * 8/2015 Aoyama ................... F16H 9/16
9,771,064 B2 * 9/2017 Nefcy .................... B60W 10/02
2013/0260960 A1 * 10/2013 Aoyama ........... B60W 30/1846
477/45
2014/0330469 A1 * 11/2014 Yoshida ................ B60W 20/10
701/22

FOREIGN PATENT DOCUMENTS

JP 2016-023800 A 2/2016
JP 2017-145958 A 8/2017

OTHER PUBLICATIONS

Filed Jan. 15, 2019, U.S. Appl. No. 16/247,893 in the name of Taichi Washio.

* cited by examiner

*Primary Examiner* — Justin Holmes
(74) *Attorney, Agent, or Firm* — Oliff PLC

(57) ABSTRACT

A control apparatus for a vehicle that including a drive-force transmitting apparatus and a hydraulic control unit. The drive-force transmitting apparatus defines a drive-force transmitting path through which a drive force is to be transmitted by a continuously-variable transmission mechanism when the drive-force transmitting path is established by engagement of an engagement device. An electromagnetic valve of the hydraulic control unit regulates a hydraulic pressure supplied to the electromagnetic valve via a hydraulic passage, such that the regulated hydraulic pressure is supplied toward the engagement device. An accumulator of the hydraulic control unit is connected to the hydraulic passage, so as to store the hydraulic pressure that flows through the hydraulic passage. The control apparatus calculates, based on a storage state of the hydraulic pressure in the accumulator, an input torque inputted to the continuously-variable transmission mechanism when the engagement device is in a releasing process state.

11 Claims, 10 Drawing Sheets

CONTROL APPARATUS FOR VEHICLE

This application claims priority from Japanese Patent Application No. 2018-020367 filed on Feb. 7, 2018, the disclosure of which is herein incorporated by reference in its entirety.

FIELD OF THE INVENTION

The present invention relates to a control apparatus for a vehicle having a plurality of drive-force transmitting paths that are provided in parallel with each other between a drive force source and drive wheels of the vehicle.

BACKGROUND OF THE INVENTION

There is known a control apparatus for a vehicle provided with a drive-force transmitting apparatus that includes: an input rotary member to which a drive force is to be transmitted from a drive force source; an output rotary member from which the drive force is to be outputted to drive wheels; a gear mechanism configured to provide at least one gear ratio; and a continuously-variable transmission mechanism, wherein the drive-force transmitting apparatus defines a plurality of drive-force transmitting paths that are provided in parallel with each other between the input rotary member and the output rotary member, and the plurality of drive-force transmitting paths include a first drive-force transmitting path through which the drive force is to be transmitted by the gear mechanism when the first drive-force transmitting path is established by engagement of a first engagement device, and a second drive-force transmitting path through which the drive force is to be transmitted by the continuously-variable transmission mechanism when the second drive-force transmitting path is established by engagement of a second engagement device. As an example of such a control apparatus, JP-2016-23800A discloses a hydraulic control apparatus for an automatic transmission. This Japanese Patent Application Publication discloses a hydraulic control unit provided in a vehicle that is equipped with a drive-force transmitting apparatus having first and second drive-force transmitting paths provided in parallel with each other such that a drive force is to be transmitted through the first drive-force transmitting path by a gear mechanism and is to be transmitted through the second drive-force transmitting path by a continuously-variable transmission mechanism. The hydraulic control unit includes (i) an electromagnetic valve configured to regulate a first hydraulic pressure supplied to the electromagnetic valve via a hydraulic passage, such that the regulated first hydraulic pressure is supplied as a second hydraulic pressure from the electromagnetic valve toward the second engagement device (that is to be engaged to establish the second drive-force transmitting path) and (ii) an accumulator that is connected to the hydraulic passage so as to store the first hydraulic pressure that flows through the hydraulic passage.

SUMMARY OF THE INVENTION

By the way, it might be possible to calculate the input torque inputted to the continuously-variable transmission mechanism (which is to be used in a shifting control of the continuously-variable transmission mechanism), depending on an operation state of the second engagement device, which is to be switched among, for example, four states consisting of a fully released state, a fully engaged state, a releasing process state and an engaging process state. For example, when the second engagement device is in the releasing process state, the input torque inputted to the continuously-variable transmission mechanism could be calculated based on a torque capacity of the second engagement device. However, where the vehicle is provided with the accumulator connected to the hydraulic passage through which a hydraulic pressure is to be supplied to the electromagnetic valve, there is a possibility that a hydraulic controllability of the second engagement device could be affected by a storage state of the hydraulic pressure in the accumulator when the second engagement device is in the releasing process state. Therefore, it is desirable that the input torque of the continuously-variable transmission mechanism is calculated with high accuracy, with the storage state of the hydraulic pressure in the accumulator being taken into consideration.

The present invention was made in view of the background art described above. It is therefore an object of the present invention to provide a control apparatus for a vehicle, which is capable of calculating the input torque inputted to the continuously-variable transmission mechanism, with improved accuracy when the second engagement device is in the releasing process state.

The object indicated above is achieved according to the following aspects of the present invention.

According to a first aspect of the invention, there is provided a control apparatus for a vehicle that includes a drive force source, drive wheels, a drive-force transmitting apparatus and a hydraulic control unit. The drive-force transmitting apparatus includes: an input rotary member to which a drive force is to be transmitted from the drive force source; an output rotary member from which the drive force is to be outputted to the drive wheels; a gear mechanism configured to provide at least one gear ratio; a continuously-variable transmission mechanism; a first engagement device; and a second engagement device. The drive-force transmitting apparatus defines a plurality of drive-force transmitting paths that are provided in parallel with each other between the input rotary member and the output rotary member. The plurality of drive-force transmitting paths include a first drive-force transmitting path through which the drive force is to be transmitted by the gear mechanism when the first drive-force transmitting path is established by engagement of the first engagement device. The plurality of drive-force transmitting paths include a second drive-force transmitting path through which the drive force is to be transmitted by the continuously-variable transmission mechanism when the second drive-force transmitting path is established by engagement of the second engagement device. The hydraulic control unit includes: an electromagnetic valve configured to regulate a first hydraulic pressure supplied to the electromagnetic valve via a hydraulic passage, such that the regulated first hydraulic pressure is supplied as a second hydraulic pressure from the electromagnetic valve toward the second engagement device, and an accumulator connected to the hydraulic passage, so as to store the first hydraulic pressure that flows through the hydraulic passage. The control apparatus comprises a transmission shifting control portion configured to calculate, based on a storage state of the first hydraulic pressure in the accumulator, an input torque inputted to the continuously-variable transmission mechanism when the second engagement device is in a releasing process state. It is noted that the calculation of the input torque based on the storage state of the first hydraulic pressure in the accumulator may be interpreted to mean also a calculation of the input torque in a manner that varies depending on which state had been established as an operation state of the second engagement device until the releasing process state has been established as the operation state of the second engagement device, because it is considered that the above-described storage state could vary depending on, for example, which one of a fully engaged state or an engaging process state had been established as the operation state of the second engagement device until the releasing process state has been established. In this sense, the transmission shifting control portion recited in this first aspect of the invention, may be defined also to as "a transmission shifting control portion configured to calculate an input torque inputted to the continuously-variable transmission mechanism during a releasing process state of the second engagement device, in a manner that varies depending on which state had been established as an operation state of the second engagement device until the releasing process state has been established as the operation state of the second engagement device". For example, when the fully engaged state had been established as the operation state of the second engagement device until the releasing process state has been established as the operation state of the second engagement device, namely, when the operation state of the second engagement device has been switched to the releasing process state from a fully engaged state, the transmission shifting control portion may be configured to obtain the output torque of the drive force source at a switching point of time at which at which the operation state of the second engagement device has been switched to the releasing process state from the fully engaged state, and to obtain an actual torque capacity value of the second engagement device at the switching point of time such that the obtained actual torque capacity value of the second engagement device is equal to a converted value of the obtained output torque of the drive force source, which is converted on a second-engagement-device rotary member on which the second engagement device is disposed. Further, when the operation state of the second engagement device has been switched to the releasing process state from the fully engaged state, the transmission shifting control portion may be configured to update the actual torque capacity value of the second engagement device during the releasing process state, such that an updated value of the actual torque capacity value is obtained by subtracting, from the obtained actual torque capacity value of the second engagement device at the switching point of time, a torque capacity reduction value that is a reduction of a torque-capacity command value of the second engagement device from the switching point of time. On the other hand, when the operation state of the second engagement device has been switched to the releasing process state from an engaging process state, the transmission shifting control portion may be configured to obtain the actual torque capacity value of the second engagement device during the releasing process state such that the obtained actual torque capacity value of the second engagement device is equal to a torque-capacity command value of the second engagement device.

According to a second aspect of the invention, in the control apparatus according to the first aspect of the invention, the continuously-variable transmission mechanism includes (i) a primary pulley, (ii) a secondary pulley, (iii) a transfer element that is looped over the primary and secondary pulleys, (iv) a primary hydraulic actuator configured to apply, to the primary pulley, a primary thrust based on which the transfer element is to be clamped by the primary pulley, and (v) a secondary hydraulic actuator configured to apply, to the second primary pulley, a secondary thrust based on which the transfer element is to be clamped by the secondary pulley, wherein the control apparatus comprises a transmission shifting control portion configured to calculate a target value of the primary thrust and a target value of the secondary thrust, based on the input torque inputted to the continuously-variable transmission mechanism.

According to a third aspect of the invention, in the control apparatus according to the second aspect of the invention, the input torque inputted to the continuously-variable transmission mechanism is defined as (a) a first input torque when being used in calculation of a thrust ratio which is a ratio of the secondary thrust to the primary thrust and which is for establishing a target gear ratio of the continuously-variable transmission mechanism, and the input torque inputted to the continuously-variable transmission mechanism is defined as (b) a second input torque when being used in calculation of the primary and secondary thrusts required to prevent a slippage of the transfer element in the continuously-variable transmission mechanism. Thus, the transmission shifting control portion is configured to calculate the first and second input torques as the input torque inputted to the continuously-variable transmission mechanism.

According to a fourth aspect of the invention, in the control apparatus according to the third aspect of the invention, the transmission shifting control portion is configured to determine that the storage state of the first hydraulic pressure in the accumulator is a completely filled state in which the accumulator is substantially filled with the first hydraulic pressure, when an operation state of the second engagement device has been switched to the releasing process state from a fully engaged state, wherein the transmission shifting control portion is configured, when the operation state of the second engagement device has been switched to the releasing process state from the fully engaged state, to select a smaller one of a first option value and a second option value, as the first input torque during the releasing process state of the second engagement device, in view of a switching point of time at which the operation state of the second engagement device has been switched to the releasing process state from the fully engaged state, wherein the first option value is a converted value of an output torque of the drive force source, which is converted on the input rotary member, and wherein the second option value is a value obtained by subtracting a converted value of a torque capacity reduction value, which is converted on the input rotary member, from a converted value of the output torque of the drive force source at the switching point of time, which is converted on the input rotary member, the torque capacity reduction value being a reduction of a torque-capacity command value of the second engagement device from the point of time.

According to a fifth aspect of the invention, in the control apparatus according to the fourth aspect of the invention, the transmission shifting control portion is configured, when the operation state of the second engagement device has been switched to the releasing process state from the fully engaged state, to select a largest one of a third option value, a fourth option value and a fifth option value, as the second input torque during the releasing process state of the second engagement device, wherein the third option value is the first input torque that is selected as the smaller one of the first option value and the second option value, wherein the fourth option value is the converted value of the output torque of the drive force source, which is converted on the input rotary member, and wherein the fifth option value is a converted value of a dragging torque of the second engagement device, which is converted on the input rotary member.

According to a sixth aspect of the invention, in the control apparatus according to any one of the third through fifth aspects of the invention, the transmission shifting control portion is configured to determine that the storage state of the first hydraulic pressure in the accumulator is an uncertain state in which it is uncertain whether the storage state is the completely filled state or not, when an operation state of the second engagement device has been switched to the releasing process state from an engaging process state, wherein the transmission shifting control portion is configured, when the operation state of the second engagement device has been switched to the releasing process state from the engaging process state, to select a smaller one of a sixth option value and a seventh option value, as the first input torque during the releasing process state of the second engagement device, wherein the sixth option value is a converted value of an output torque of the drive force source, which is converted on the input rotary member, and wherein the seventh option value is a converted value of a torque-capacity command value of the second engagement device, which is converted on the input rotary member.

According to a seventh aspect of the invention, in the control apparatus according to the sixth aspect of the invention, the transmission shifting control portion is configured, when the operation state of the second engagement device has been switched to the releasing process state from the engaging process state, to select a largest one of an eighth option value, a ninth option value and a tenth option value, as the second input torque during the releasing process state of the second engagement device, wherein the eighth option value is the first input torque that is selected as the smaller one of the sixth option value and the seventh option value, wherein the ninth option value is the converted value of the output torque of the drive force source, which is converted on the input rotary member, and wherein the tenth option value is a converted value of a dragging torque of the second engagement device, which is converted on the input rotary member.

According to an eighth aspect of the invention, in the control apparatus according to any one of the first through seventh aspects of the invention, there is further provided an operation-state determining portion that is configured to determine that the operation state of the second engagement device has been switched to the releasing process state, if a transition-completion condition is satisfied when the second engagement device had been in the fully engaged state, wherein the transition-completion condition is that a rotational speed difference of the second engagement device is not smaller than a predetermined difference value with the hydraulic control being executed to release the second engagement device, wherein the operation-state determining portion is configured to determine that the operation state of the second engagement device has been switched to the releasing process state, if another transition-completion condition is satisfied when the second engagement device had been in the engaging process sate, and wherein the another transition-completion condition is that the hydraulic control is executed to release the second engagement device.

In the control apparatus according to the first aspect of the invention, the input torque inputted to the continuously-variable transmission mechanism during the releasing process state of the second engagement device is calculated based on the storage state of the first hydraulic pressure in the accumulator. Thus, the input torque inputted to the continuously-variable transmission mechanism can be calculated more accurately than where it is calculated without the storage state of the first hydraulic pressure in the accumulator being taken into account. Therefore, it is possible to improve an accuracy of calculation of the input torque inputted to the continuously-variable transmission mechanism during the releasing process state of the second engagement device.

In the control apparatus according to the second aspect of the invention, the target value of the primary thrust and the target value of the secondary thrust are calculated based on the accurately calculated input torque inputted to the continuously-variable transmission mechanism during the releasing process state of the second engagement device. That is, the continuously-variable transmission mechanism can be appropriately controlled by using the accurately calculated input torque inputted to the continuously-variable transmission mechanism during the releasing process state of the second engagement device.

In the control apparatus according to the third aspect of the invention, the first input torque that is used in calculation of the thrust ratio for establishing the target gear ratio of the continuously-variable transmission mechanism and the second input torque that is used in calculation of the primary and secondary thrusts required to prevent a slippage of the transfer element in the continuously-variable transmission mechanism are calculated as the input torque inputted to the continuously-variable transmission mechanism. Thus, the continuously-variable transmission mechanism can be appropriately controlled.

In the control apparatus according to the fourth aspect of the invention, even without a hydraulic sensor or the like configured to detect the storage state of the first hydraulic pressure in the accumulator, it is possible to determine that the storage state of the first hydraulic pressure in the accumulator is the completely filled state when the operation state of the second engagement device has been switched to the releasing process state from the fully engaged state. Further, when the operation state of the second engagement device has been switched to the releasing process state from the fully engaged state, it is possible to appropriately calculate the first input torque during the releasing process state of the second engagement device.

In the control apparatus according to the fifth aspect of the invention, when the operation state of the second engagement device has been switched to the releasing process state from the fully engaged state, it is possible to appropriately calculate the second input torque during the releasing process state of the second engagement device.

In the control apparatus according to the sixth aspect of the invention, even without a hydraulic sensor or the like configured to detect the storage state of the first hydraulic pressure in the accumulator, it is possible to determine that the storage state of the first hydraulic pressure in the accumulator is the uncertain state when the operation state of the second engagement device has been switched to the releasing process state from the engaging process state. Further, it is possible to appropriately calculate the first input torque during the releasing process state of the second engagement device, when the operation state of the second engagement device has been switched to the releasing process state from the engaging process state.

In the control apparatus according to the seventh aspect of the invention, when the operation state of the second engagement device has been switched to the releasing process state from the engaging process state, it is possible to appropriately calculate the second input torque during the releasing process state of the second engagement device.

In the control apparatus according to the eighth aspect of the invention, it is determined that the operation state of the second engagement device has been switched to the releasing process state, if a transition-completion condition is satisfied when the second engagement device had been in the fully engaged state, wherein the transition-completion condition is that the rotational speed difference of the second engagement device is not smaller than the predetermined difference value with the hydraulic control being executed to release the second engagement device. Thus, it can be appropriately determined that the operation state of the second engagement device has been switched to the releasing process state. Further, it is determined that the operation state of the second engagement device has been switched to the releasing process state, if another transition-completion condition is satisfied when the second engagement device had been in the engaging process state, wherein the other transition-completion condition is that the hydraulic control is executed to release the second engagement device. Thus, it can be appropriately determined that the operation state of the second engagement device has been switched to the releasing process state.

DETAILED DESCRIPTION OF PREFERRED EMBODIMENT

Figure 1:
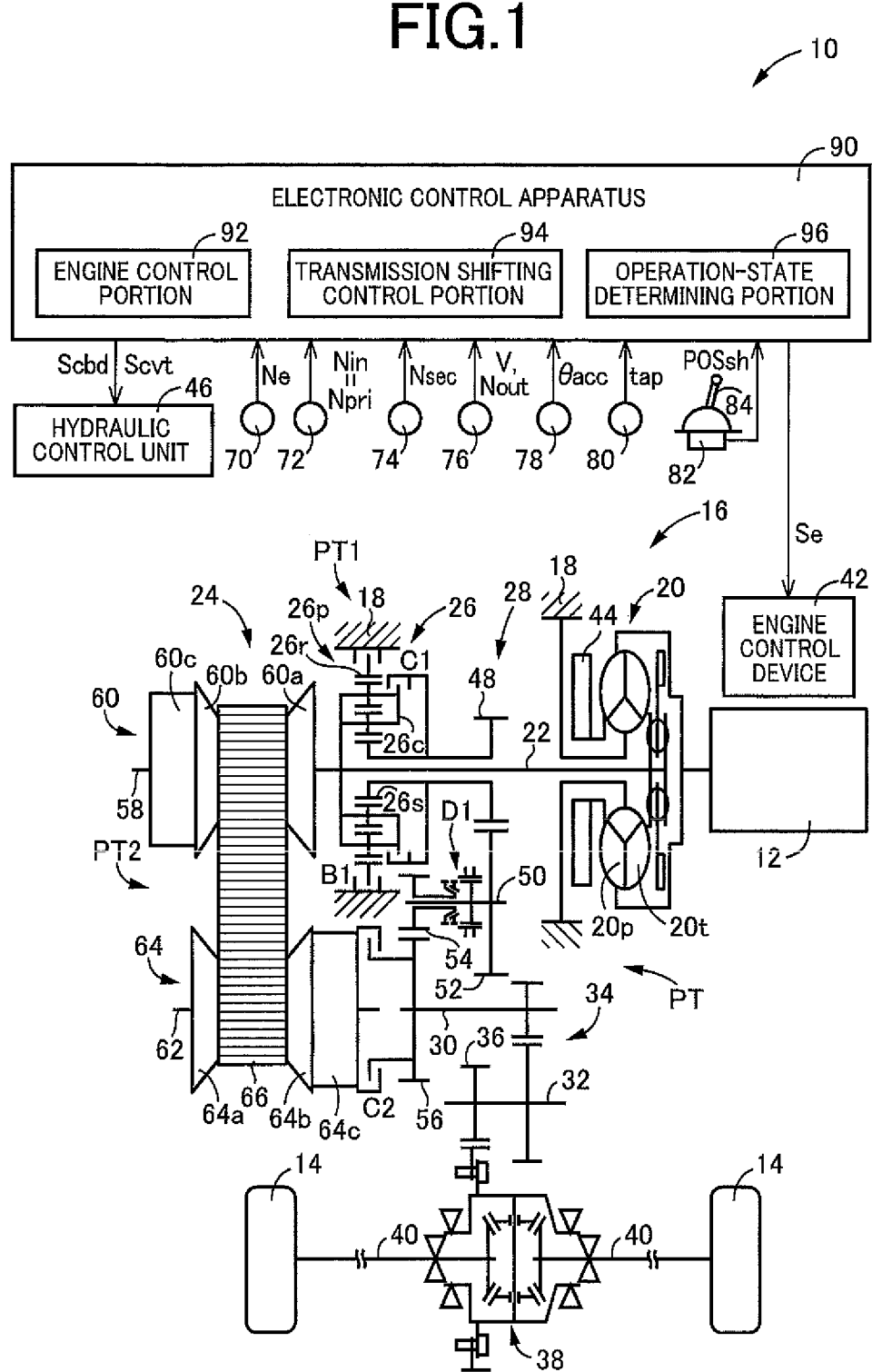
FIG. 1 is a schematic view showing a construction of a vehicle to be controlled by a control apparatus according to the present invention, and major control functions and control portions of the control apparatus.

In the embodiment of the present invention, the control apparatus for a vehicle further includes an operation-state determining portion that is configured to determine which one of a plurality of states (such as a fully released state, a fully engaged state, a releasing process state and an engaging process state) is established as the operation state of the second engagement device, by determining whether a plurality of transition-completion conditions, each of which is required to determine that a transition of the operation state of the second engagement device to a corresponding one of the plurality of states from another of the plurality of states has been completed, are satisfied or not, based on (α) a state of the hydraulic control executed to control the hydraulic pressure supplied to the second engagement device and (β) a rotational speed difference of the second engagement device.

In the embodiment of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. The above-described hydraulic control unit is configured to control pulley hydraulic pressures supplied as working hydraulic pressures to the respective hydraulic actuators, independently of each other. The hydraulic control unit may be configured to control an amount of flow of a working fluid supplied to each of the hydraulic actuators so as to consequently generate the pulley hydraulic pressures, for example. A shifting control operation is performed by the hydraulic control unit to execute a shifting action to establish a target gear ratio while preventing slippage of a transfer element in the continuously-variable transmission mechanism, by controlling the thrust (=pulley hydraulic pressure*pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

Further, the term "gear ratio" is defined as "rotational speed of input-side rotary member/rotational speed of output-side rotary member". For example, the gear ratio of the above-described continuously-variable transmission is defined as "rotational speed of the primary pulley/rotational speed of the secondary pulley", and the gear ratio of the above-described drive-force transmitting apparatus is defined as "rotational speed of the input rotary member/rotational speed of the output rotary member". A vehicle running speed could be lower as the gear ratio is higher, and could be higher as the gear ratio is lower. For example, a highest gear ratio can be expressed also as a lowest-speed gear ratio.

The above-described drive force source is, for example, an internal combustion engine such as a gasoline engine and a diesel engine generating a drive force by combustion of fuel supplied thereto. The vehicle may be equipped with, in addition to or in place of a drive force source in the form of the engine, another drive force source in the form of, for example, an electric motor.

Hereinafter, a preferred embodiment of the invention will be described in detail with reference to the accompanying drawings.

EMBODIMENT

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path through which the drive force of the engine 12 is to be transmitted from the input shaft 22 toward the drive wheels 14 by the gear mechanism 28. The second drive-force transmitting path PT2 is a path through which the drive force of the engine 12 is to be transmitted from the input shaft 22 toward the drive wheels 14 by the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake B1 and a second clutch C2. The first clutch C1, which serves as a first engagement device, is provided in the first drive-force transmitting path PT1 and configured to selectively connect and disconnect the first drive-force transmitting path PT1, such that the first drive-force transmitting path PT1 is established with engagement of the first clutch C1 during forward running of the vehicle 10. The first brake B1, which serves as another first engagement device, is provided in the first drive-force transmitting path PT1 and configured to selectively connect and disconnect the first drive-force transmitting path PT1, such that the first drive-force transmitting path PT1 is established with engagement of the first brake B1 during reverse running of the vehicle 10. That is, the first drive-force transmitting path PT1 is established with either the first clutch C1 or the first brake B1 being engaged. The second clutch C2, which serves as a second engagement device, is disposed in the second drive-force transmitting path PT2 and configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a hydraulic actuator. As described below, each of the first clutch C1 and the first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 90 (that corresponds to "control apparatus" recited in the appended claims), based on an operation amount θacc of an accelerator pedal that corresponds to a required drive force of the vehicle 10 required by an operator of the vehicle 10, whereby an engine torque Te as an output torque of the engine 12 is controlled.

The torque converter 20 is provided with a pump impeller 20p and a turbine impeller 20t that are connected to the engine 12 and the input shaft 22, respectively. The drive-force transmitting apparatus 16 is provided with a mechanical oil pump 44 connected to the pump impeller 20p. The oil pump 44 is to be driven by the engine 12, to supply a working fluid pressure as its original pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24, and switching an operation state of each of the above-described engagement devices between its engaged state and released state.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is connected to a small-diameter gear 48 that is provided to be coaxial with the input shaft 22 and rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is provided to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 that is provided to be coaxial with the gear-mechanism counter shaft 50 and rotatable relative to the gear-mechanism counter shaft 50, and an output gear 56 that is provided to be coaxial with the output shaft 30 and unrotatable relative to the output shaft 30. The output gear 56 has a diameter larger than that of the idler gear 54. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 52 and the idler gear 54 so as to selectively connect and disconnect a drive-force transmitting path between the two gears 52, 54. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as an engagement device that cooperates with the first clutch C1 or the first brake B1 to establish the first drive-force transmitting path PT1. That is, the first drive-force transmitting path PT1 is established with both of the dog clutch D1 and the first clutch C1 or both of the dog clutch D1 and the first brake B1 being engaged. An operation state of the dog clutch D1 is switched by operation of a hydraulic actuator (not shown) that is included in the drive-force transmitting apparatus 16.

The first drive-force transmitting path PT1 is established with both of the dog clutch D1 and the first engagement device being engaged, namely, with both of engagement of the dog clutch D1 and engagement of either one of the first clutch C1 and the first brake B1 which cooperate with each other to constitute the first engagement device and which are located to be closer to the input shaft 22 than the dog clutch D1. When the first clutch C1 as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

Figure 2:
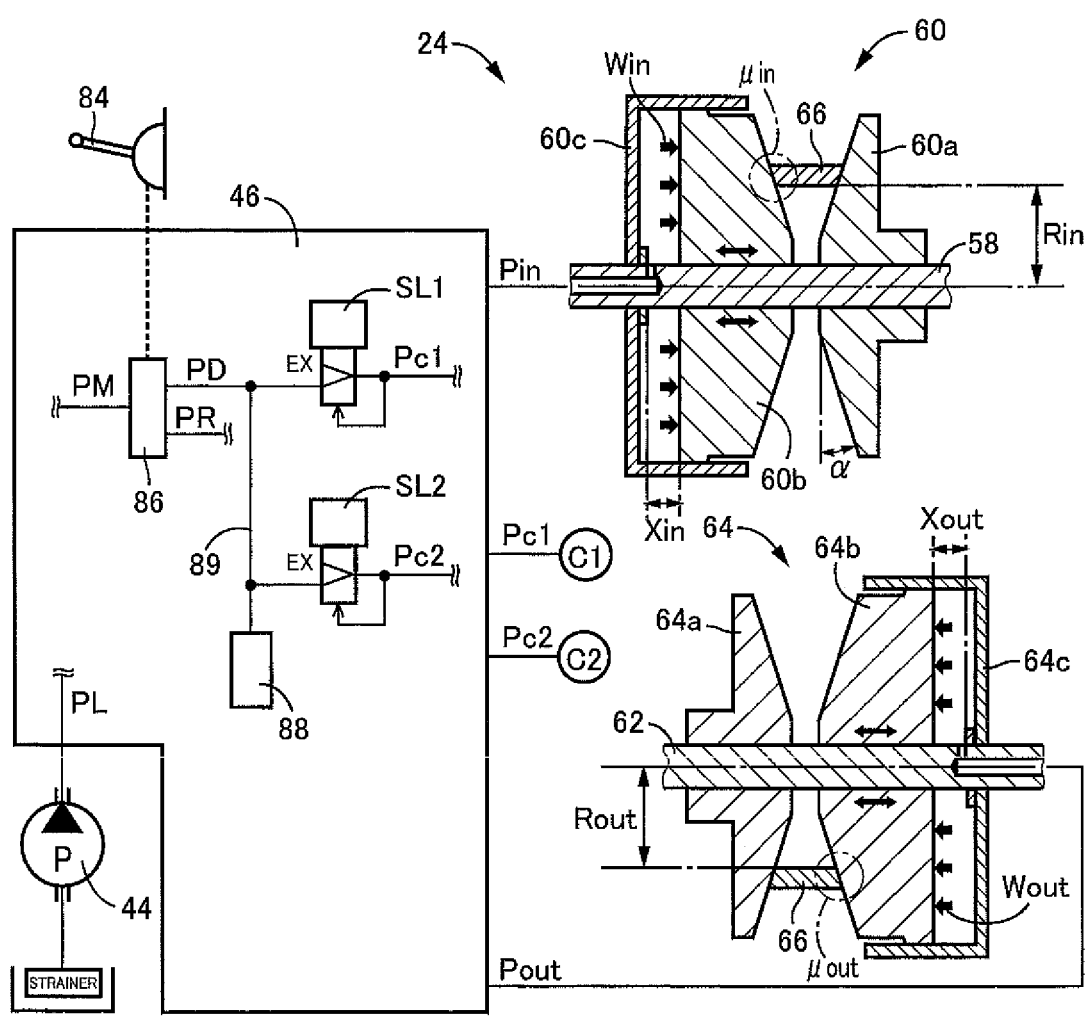
FIG. 2 is a view for explaining a construction of a continuously-variable transmission mechanism and a construction of a hydraulic control unit.

FIG. 2 is a view for explaining a construction of the continuously-variable transmission mechanism 24. As shown in FIGS. 1 and 2, the continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a hydraulic actuator 60c configured to apply a primary thrust Win to the movable sheave 60b. The primary thrust Win is a thrust (=primary pressure Pin*pressure receiving area) for changing a width of a V-shaped groove defined between the fixed and movable sheaves 60a, 60b of the primary pulley 60. That is, the primary thrust Win is a thrust applied to the primary pulley 60 from the hydraulic actuator 60c, to clamp the transmission belt 66 that is mounted on the primary pulley 60. The primary pressure Pin is a hydraulic pressure supplied from the hydraulic control unit 46 to the hydraulic actuator 60c, and serves as a pulley hydraulic pressure for generating the primary thrust Win. Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a secondary hydraulic actuator 64c configured to apply a secondary thrust Wout to the movable sheave 64b. The secondary thrust Wout is a thrust (=secondary pressure Pout*pressure receiving area) for changing a width of a V-shaped groove defined between the fixed and movable sheaves 64a, 64b of the secondary pulley 64. That is, the secondary thrust Wout is a thrust applied to the secondary pulley 64 from the secondary hydraulic actuator 64c, to clamp the transmission belt 66 that is mounted on the secondary pulley 64. The secondary pressure Pout is a hydraulic pressure supplied from the hydraulic control unit 46 to the secondary hydraulic actuator 64c, and serves as a pulley hydraulic pressure for generating the secondary thrust Wout.

In the continuously-variable transmission mechanism 24, the primary and secondary pressures Pin, Pout are controlled by the hydraulic control unit 46 that is controlled by the electronic control apparatus 90, whereby the primary and secondary thrusts Win, Wout are respectively controlled. With the primary and secondary thrusts Win, Wout being controlled, the widths of the V-shaped grooves of the respective pulleys 60, 64 are controlled to be changeable whereby a belt winding diameter (effective diameter) of each of the pulleys 60, 64 is changeable and accordingly a gear ratio $\gamma cvt$ (=primary rotational speed Npri/secondary rotational speed Nsec) of the continuously-variable transmission mechanism 24 is changeable. Further, with the primary and secondary thrusts Win, Wout being controlled, the belt clamping force is controlled such that slipping of the transmission belt 66 is not caused. That is, with the primary and secondary thrusts Win, Wout being controlled, the gear ratio $\gamma cvt$ of the continuously-variable transmission mechanism 24 is controlled to a target gear ratio $\gamma cvttgt$ while the transmission belt 66 is prevented from being slipped. It is noted that the primary rotational speed Npri represents a rotational speed of the primary shaft 58 and that the secondary rotational speed Nsec represents a rotational speed of the secondary shaft 62.

In the continuously-variable transmission mechanism 24, when the primary pressure Pin is increased, the width of the V-shaped groove of the primary pulley 60 is reduced whereby the gear ratio $\gamma cvt$ is reduced. The reduction of the gear ratio $\gamma cvt$ corresponds to a shift-up action performed in the continuously-variable transmission mechanism 24. In the continuously-variable transmission mechanism 24, the lowest gear ratio $\gamma min$ is provided with the width of the V-shaped groove of the primary pulley 60 being minimized. Within a range of the gear ratio $\gamma cvt$ that can be provided by the continuously-variable transmission mechanism 24, the lowest gear ratio gear ratio $\gamma min$ is a value of the gear ratio $\gamma cvt$ which makes it possible to maximize the running speed of the vehicle 10. Further, in the continuously-variable transmission mechanism 24, when the primary pressure Pin is reduced, the width of the V-shaped groove of the primary pulley 60 is increased whereby the gear ratio $\gamma cvt$ is increased. The increase of the gear ratio $\gamma cvt$ corresponds to a shift-down action performed in the continuously-variable transmission mechanism 24. In the continuously-variable transmission mechanism 24, the highest gear ratio $\gamma max$ is provided with the width of the V-shaped groove of the primary pulley 60 being maximized. Within the range of the gear ratio $\gamma cvt$ that can be provided by the continuously-variable transmission mechanism 24, the highest gear ratio gear ratio $\gamma max$ is a value of the gear ratio $\gamma cvt$ which makes it possible to minimize the running speed of the vehicle 10. In the continuously-variable transmission mechanism 24, the belt slippage is prevented by the primary thrust Win and the secondary thrust Wout, and the target gear ratio $\gamma cvttgt$ is established by a combination of the primary thrust Win and the secondary thrust Wout, rather than by only one of the primary thrust Win and the secondary thrust Wout. As described below, the gear ratio $\gamma cvt$ of the continuously-variable transmission mechanism 24 is changed with change of a thrust ratio $\tau$ (=Wout/Win) which is a ratio of the secondary thrust Wout to the primary thrust Win and which is dependent on a relationship between the primary pressure Pin and the secondary pressure Pout. For example, the gear ratio $\gamma cvt$ is increased with increase of the thrust ratio $\tau$, namely, a shift-down action of the continuously-variable transmission mechanism 24 is caused with increase of the thrust ratio $\tau$.

The output shaft 30 is provided to be coaxial with the secondary shaft 62 and rotatable relative to the secondary shaft 62. The second clutch C2 is provided in a drive-force transmitting path (that corresponds to a part of the above-described second drive-force transmitting path PT2) between the secondary pulley 64 and the output shaft 30. The secondary shaft 62 corresponds to "second-engagement-device rotary member" recited in the appended claims. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable. The gear ratio $\gamma cvt$ of the continuously-variable transmission mechanism 24 corresponds to a gear ratio established in the second drive-force transmitting path PT2.

In the drive-force transmitting apparatus 16, a gear ratio EL of the gear mechanism 28, which is a gear ratio $\gamma gear$ (=input-shaft rotational speed Nin/output-shaft rotational speed Nout) provided in the first drive-force transmitting path PT1, is higher than the above-described highest gear ratio $\gamma max$ of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16. Thus, any gear ratio provided in the second drive-force transmitting path PT2 is lower than the gear ratio provided in the first drive-force transmitting path PT1. It is noted that the input-shaft rotational speed Nin represents a rotational speed of the input shaft 22 and that the output-shaft rotational speed Nout represents a rotational speed of the output shaft 30.

The vehicle 10 can run in a selected one of the gear running mode and the belt running mode. The gear running mode is a running mode in which the vehicle 10 runs with the drive force being transmitted through the first drive-force transmitting path PT1 that is established in the drive-force transmitting apparatus 16. The belt running mode is a running mode in which the vehicle 10 runs with the drive force being transmitted through the second drive-force transmitting path PT2 that is established in the drive-force transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26p from being rotated at high speeds.

The vehicle 10 is provided with the electronic control apparatus 90 as a controller including the control apparatus constructed according to present invention. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 is configured to perform, for example, an engine control operation for controlling an output of the engine 12, a shifting control operation and a belt-clamping-force control operation for the continuously-variable transmission mechanism 24, and a hydraulic control operation for switching the operation state of each of the plurality of engagement devices (C1, B1, C2, D1). The electronic control apparatus 90 may be constituted by two or more control units exclusively assigned to perform different control operations such as the engine control operation and the hydraulic control operation.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne which is a rotational speed of the engine 12; an output signal of a primary speed sensor 72 indicative of a primary rotational speed Npri which is a rotational speed of the primary shaft 58 which is equivalent to an input-shaft rotational speed Nin; an output signal of a secondary speed sensor 74 indicative of a secondary rotational speed Nsec which is a rotational speed of the secondary shaft 62; an output signal of an output speed sensor 76 indicative of an output-shaft rotational speed Nout which is a rotational speed of the output shaft 30 and which corresponds to the running speed V of the vehicle 10; an output signal of an accelerator-operation amount sensor 78 indicative of an accelerator operation amount θacc which represents an amount of accelerating operation made by a vehicle operator; an output signal of a throttle-opening degree sensor 80 indicative of the throttle opening degree tap; and an output signal of a shift position sensor 82 indicative of an operation position POSsh of a manually-operated shifting member in the form of a shift lever 84 provided in the vehicle 10. Further, the electronic control apparatus 90 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, and a hydraulic-control command signal Scbd for performing hydraulic controls such as controls of operation states of the plurality of engagement devices. It is noted that the input-shaft rotational speed Nin (=primary rotational speed Npri) is equivalent to a rotational speed of the turbine impeller 20t of the of the torque converter 20. It is also noted that the primary rotational speed Npri is equivalent to a rotational speed of the primary pulley 60 and that the secondary rotational speed Nsec is equivalent to a rotational speed of the secondary pulley 64. Further, the electronic control apparatus 90 calculates an actual gear ratio γcvt (=Npri/Nsec) that is an actual value of the gear ratio γcvt of the continuously-variable transmission mechanism 24, based on the primary rotational speed Npri and the secondary rotational speed Nsec.

The shift lever 84 is operable to be placed in a selected one of a plurality of operation positions POSsh that consist of, for example, a parking position P, a reverse position R, a neutral position N and a drive position D. With the shift lever 84 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. That is, the neutral state is a state of the drive-force transmitting apparatus 16 in which neither the first drive-force transmitting path PT1 nor the second drive-force transmitting path PT2 is established. With the shift lever 84 being placed in the reverse position R, the drive-force transmitting apparatus 16 is placed in its reverse drive position for enabling the reverse running of the vehicle 10 in the gear running mode. With the shift lever 84 being placed in the neutral position N, the drive-force transmitting apparatus 16 is placed in its neutral position in which the drive-force transmitting apparatus 16 is placed in its neutral state. With the shift lever 84 being placed in the drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24.

As shown in FIG. 2, the hydraulic control unit 46 includes a C1 solenoid valve SL1 connected to the first clutch C1, a C2 solenoid valve SL2 connected to the second clutch C2, a mechanical valve 86 and an accumulator 88.

The mechanical valve 86 is mechanically associated with the shift lever 84, so that an operation state of the mechanical valve 86 is to be switched in association with a switching operation made through the shift lever 84, namely, a hydraulic passage defined by the mechanical valve 86 is changed by the switching operation. The mechanical valve 86 is operated such that a modulator pressure PM, which is inputted to the mechanical valve 86, is outputted as a drive pressure PD when the shift lever 84 is placed in the drive position D, and such that the modulator pressure PM is outputted as a reverse pressure PR when the shift lever 84 is placed in the reverse position R. Further, when the shift lever 84 is placed in the neutral position N or in the parking position P, the mechanical valve 86 is operated to stop flow of the modulator pressure PM therethrough, and to cause the drive pressure PD and the reverse pressure PR to be discharged. The drive pressure PD may be referred also to as a drive range pressure or a forward hydraulic pressure. The reverse pressure PR may be referred also to as a reverse range pressure or a reverse hydraulic pressure. The hydraulic control unit 46 further includes a primary regulator valve (not shown) to which a hydraulic pressure is supplied from the oil pump 44. The hydraulic pressure supplied to the primary regulator valve is regulated, by the primary regulator valve, to a pressure value dependent on a degree of an engine load that is represented by, for example, the throttle opening degree $\theta$ap. The thus regulated hydraulic pressure is supplied as a line pressure PL to a modulator valve (not shown) that is also included in the hydraulic control unit 46. The line pressure PL is regulated by the modulator valve to a certain pressure value, and is supplied as the modulator pressure PM to the mechanical valve 86.

The C1 solenoid valve SL1 is an electromagnetic valve configured to regulate the drive pressure PD as a first hydraulic pressure, which is supplied to the C1 solenoid valve SL1 via a drive-pressure passage 89 as a hydraulic passage, such that the regulated drive pressure PD is supplied as a hydraulic pressure Pc1 from the C1 solenoid valve SL1 toward the first clutch C1. The C2 solenoid valve SL2 is an electromagnetic valve configured to regulate the drive pressure PD as the first hydraulic pressure, which is supplied to the C2 solenoid valve SL2 via the drive-pressure passage 89 as the hydraulic passage, such that the regulated drive pressure PD is supplied as a hydraulic pressure Pc2 from the C2 solenoid valve SL2 toward the second clutch C2. The hydraulic pressure Pc1 supplied to the first clutch C1 will be referred to as "C1 cutch pressure Pc1". The hydraulic pressure Pc2 (second hydraulic pressure) supplied to the second clutch C2 will be referred to as "C2 cutch pressure Pc2". The operation state of the first clutch C1 is switched by change of the torque capacity of the first clutch C1 which is made depending on the C1 clutch pressure Pc1. The operation state of the second clutch C2 is switched by change of the torque capacity of the second clutch C2 which is made depending on the C2 clutch pressure Pc2. The torque capacity of the first clutch C1 will be referred to as "C1 clutch torque Tcltc1". The torque capacity of the second clutch C2 will be referred to as "C2 clutch torque Tcltc2". The C1 solenoid valve SL1 and C2 solenoid valve SL2 are basically identical with each other in construction, and are controlled by the electronic control apparatus 90. The C1 clutch pressure Pct and C2 clutch pressure Pc2 are regulated independently from each other, with electric currents supplied to the respective first and second clutches C1, C2 being controlled by the electronic control apparatus 90 independently from each other. Thus, the hydraulic control unit 46 supplies the C1 clutch pressure Pc1 and C2 clutch pressure Pc2, each of which is regulated to a command pressure value represented by the hydraulic-control command signal Scbd, to the respective first and second clutches C1, C2 through the respective C1 solenoid valve SL1 and C2 solenoid valve SL2. The command pressure value, to which the C1 clutch pressure Pc1 is regulated, will be referred to as "C1 command pressure value". The command pressure value, to which the C2 clutch pressure Pc2 is regulated, will be referred to as "C2 command pressure value".

The accumulator 88 is connected to the drive-pressure passage 89, so as to store the drive pressure PD that flows through the drive-pressure passage 89. The accumulator 88 is a known hydraulic accumulator which includes a spring and a sealing member restraining leakage of a working fluid and which is capable of accumulating a hydraulic pressure and supplying the accumulated hydraulic pressure. When a hydraulic pressure in the drive-pressure passage 89 is higher than a hydraulic pressure in the accumulator 88, the hydraulic pressure is supplied from the drive-pressure passage 89 to the accumulator 88. When the hydraulic pressure in the accumulator 88 is higher than the hydraulic pressure in the drive-pressure passage 89, the hydraulic pressure is supplied from the accumulator 88 to the drive-pressure passage 89.

For performing various control operations in the vehicle 10, the electronic control apparatus 90 includes an engine control means or portion in the form of an engine control portion 92 and a transmission shifting control means or portion in the form of a transmission shifting control portion 94.

The engine control portion 92 calculates a target drive force Fwtgt, for example, by applying the accelerator operation amount $\theta$acc and the running velocity V to a predetermined or stored relationship (e.g., drive force map) that is obtained by experimentation or determined by an appropriate design theory. The engine control portion 92 sets a target engine torque Tetgt that ensures the target drive force Fwtgt, and outputs the engine-control command signal Se for controlling the engine 12 so as to obtain the target engine torque Tetgt. The outputted engine-control command signal Se is supplied to the engine control device 42.

When the operation position POSsh of the shift lever 84 is the parking position P or the neutral position N during stop of the vehicle 10, the transmission shifting control portion 94 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission shifting control portion 94 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission shifting control portion 94 supplies, to the hydraulic control unit 46, the hydraulic-control command signal Scbd requesting engagement of the first brake B1, whereby the gear running mode is established to enable reverse running of the vehicle 10.

When the operation position POSsh is the drive position D, the transmission shifting control portion 94 executes a switching control operation for switching the running mode between the gear running mode and the belt running mode. Specifically, the transmission shifting control portion 94 determines whether shifting from one of first and second speed positions to the other is to be executed or not, by applying the running speed V and the accelerator operation amount θacc to a stepped shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path PT1 during the gear running mode. The second speed position corresponds to the above-described highest gear ratio γmax that is the highest one of the gear ratios (or that is a maximum value within a given range of a continuously-variable gear ratio) provided in the continuously-variable transmission mechanism 24 by which the drive force is to be transmitted through the second drive-force transmitting path PT2 during the belt running mode. Then, when determining that the shifting is to be executed, the transmission shifting control portion 94 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position during running in the gear running mode, the transmission shifting control portion 94 supplies, to the hydraulic control unit 46, the hydraulic-control command signal Scbd requesting releasing and engaging actions of the respective first and second clutches C1, C2, so as to perform a so-called "clutch to clutch" shifting operation. As a result of the shifting up from the first speed position to the second speed position, the second drive-force transmitting path PT2 is established in place of the first drive-force transmitting path PT1 in the drive-force transmitting apparatus 16. Thus, the transmission shifting control portion 94 executes a stepped shifting control to release and engage the first and second clutches C1, C2, respectively, so as to cause the drive-force transmitting apparatus 16 to execute the shift-up action by which the selected running mode (i.e., selected state) is switched from the gear running mode (i.e., first state) in which the first drive-force transmitting path PT1 is established to the belt running mode (i.e., second state) in which the second drive-force transmitting path PT2 is established. In the following descriptions relating to the present embodiment, the shift-up action, which is executed by the drive-force transmitting apparatus 16 to switch the selected running mode from the gear running mode to the belt running mode, will be referred to as "stepped shift-up action".

When determining that the running mode is to be switched from the belt running mode to the gear running mode so as to execute the shifting down from the second speed position to the first speed position during running in the belt running mode, the transmission shifting control portion 94 supplies, to the hydraulic control unit 46, the hydraulic-control command signal Scbd requesting releasing and engaging actions of the respective second and first clutches C2, C1, so as to perform the clutch to clutch shifting operation. As a result of the shifting down from the second speed position to the first speed position, the first drive-force transmitting path PT1 is established in place of the second drive-force transmitting path PT2 in the drive-force transmitting apparatus 16. Thus, the transmission shifting control portion 94 executes a stepped shifting control to engage and release the first and second clutches C1, C2, respectively, so as to cause the drive-force transmitting apparatus 16 to execute the shift-down action by which the selected running mode is switched from the belt running mode in which the second drive-force transmitting path PT2 is established to the gear running mode in which the first drive-force transmitting path PT1 is established. In the following descriptions relating to the present embodiment, the shift-down action, which is executed by the drive-force transmitting apparatus 16 to switch the selected running mode from the belt running mode to the gear running mode, will be referred to as "stepped shift-down action".

In the switching control operation for switching the running mode between the gear running mode and the belt running mode, the switching between the first and second drive-force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained.

For executing a shifting action in the continuously-variable transmission mechanism 24 during the belt running mode, the transmission shifting control portion 94 supplies, to the hydraulic control unit 46, the hydraulic-control command signal Scvt for controlling the primary pressure Pin and the secondary pressure Pout such that the target gear ratio γcvttgt is established in the continuously-variable transmission mechanism 24 while the belt slippage is not caused in the continuously-variable transmission mechanism 24. This hydraulic-control command signal Scvt includes a primary-pressure command signal Spin requesting the primary pressure Pin to become a target primary pressure Pintgt and a secondary-pressure command signal Spout requesting the secondary pressure Pout to become a target secondary pressure Pouttgt.

The target primary pressure Pintgt is a target value of the primary pressure Pin by which a primary target thrust Wintgt that is a target value of the primary thrust Win applied to the primary pulley 60 is generated. The target secondary pressure Pouttgt is a target value of the secondary pressure Pout by which a secondary target thrust Wouttgt that is a target value of the secondary thrust Wout applied to the secondary pulley 64 is generated. In calculation of each of the primary target thrust Wintgt and the secondary target thrust Wouttgt, a required thrust, which is minimally required to prevent the belt slippage on a corresponding one of the primary and secondary pulleys 60, 64, is taken into consideration. This required thrust is a belt-slip limit thrust Wlmt that is a thrust value shortly before occurrence of the belt slippage in the continuously-variable transmission mechanism 24. In the following descriptions relating to the present embodiment, the belt-slip limit thrust Wlmt will be referred to as "slip limit thrust Wlmt".

Specifically, the transmission shifting control portion 94 calculates each of the primary target thrust Wintgt and the secondary target thrust Wouttgt. The transmission shifting control portion 94 compares the secondary thrust Wout, which is calculated based on a primary-side slip limit thrust Winlmt that is the slip limit thrust Wlmt minimally required to prevent slippage of the transmission belt 66 on the primary pulley 60, with a secondary-side slip limit thrust Woutlmt that is the slip limit thrust Wlmt minimally required to prevent slippage of the transmission belt 66 on the secondary pulley 64, and then selects a larger one of the secondary thrust Wout and the secondary-side slip limit thrust Woutlmt. The secondary thrust Wout, which is calculated based on the primary-side slip limit thrust Winlmt, is a secondary-side shifting-control thrust Woutsh that is required to be applied to the second pulley 64 in a shifting control, as described below.

The transmission shifting control portion 94 sets, as the primary target thrust Wintgt, the primary thrust Win calculated based on the secondary target thrust Wouttgt. The primary thrust Win, which is calculated based on the secondary target thrust Wouttgt, is a primary-side shifting-control thrust Winsh that is required to be applied to the primary pulley 60 in a shifting control, as described below. Further, as described below, the transmission shifting control portion 94 compensates the primary-side shifting-control thrust Winsh, namely, compensates the primary target thrust Wintgt, by a feedback control of the primary thrust Win that is executed based on a gear ratio deviation $\Delta\gamma cvt$ ($=\gamma cvttgt-\gamma cvt$) that is a deviation of the actual gear ratio $\gamma cvt$ from the target gear ratio $\gamma cvttgt$.

In the above-described compensation of the primary-side shifting-control thrust Winsh, a deviation of an actual value from a target value in each parameter that has a one-to-one correspondence relationship with the gear ratio $\gamma cvt$ may be used in place of the gear ratio deviation $\Delta\gamma cvt$. For example, in the compensation of the primary-side shifting-control thrust Winsh, it is possible to use a deviation $\Delta Xin$ ($=Xintgt-Xin$) of an actual position Xin of the movable sheave 60b from a target position Xintgt of the movable sheave 60b in the primary pulley 60 (see FIG. 2), a deviation $\Delta Xout$ ($=Xoutgt-Xout$) of an actual position Xout of the movable sheave 64b from a target position Xintgt of the movable sheave 64b in the secondary pulley 64 (see FIG. 2), a deviation $\Delta Rin$ ($=Rintgt-Rin$) of an actual belt-winding diameter (actual effective diameter) Rin from a target belt-winding diameter (target effective diameter) Rintgt in the primary pulley 60 (see FIG. 2), a deviation $\Delta Rout$ ($=Routtgt-Rout$) of an actual belt-winding diameter (actual effective diameter) Rout from a target belt-winding diameter (target effective diameter) Routtgt in the secondary pulley 64 (see FIG. 2), and a deviation $\Delta Npri$ ($=Npritgt-Npri$) of an actual primary rotational speed Npri from a target primary rotational speed Npritgt.

Each of the above-described primary-side shifting-control thrust Winsh and secondary-side shifting-control thrust Woutsh is a thrust required to be applied to a corresponding one of the primary and secondary pulleys 60, 64 in a shifting control to execute a desired shifting action to establish the target gear ratio $\gamma cvttgt$ at a target shifting speed $d\gamma tgt$ (that is a target value of a shifting speed $d\gamma$). The shifting speed $d\gamma$ is a rate ($=d\gamma cvt/dt$) of change of the gear ratio $\gamma cvt$, namely, an amount ($=d\gamma cvt/dt$) of change of the gear ratio $\gamma cvt$ per a unit of time. In the present embodiment, the shifting speed $d\gamma$ is defined as an amount ($=dX/dNelm$) of pulley displacement per an element of the transmission belt 66, wherein "dX" represents an amount of displacement of the pulley in an axial direction of the pulley per a unit of time, and "dNelm" represents a number of elements (of the transmission belt 66) that are caused to bite into the pulley (i.e., caused to enter the V-shaped groove of the pulley) per the unit of time. The shifting speed $d\gamma$ is represented by a primary shifting speed $d\gamma in$ ($=dXin/dNelmin$) and a secondary shifting speed $d\gamma out$ ($=d\,Xout/dNelmout$).

The thrust, which is applied to each of the pulleys 60, 64 in a steady state in which the gear ratio $\gamma cvt$ is constant, is referred to as "balance thrust Wbl" that is referred also to as "steady thrust". The thrust ratio $\tau$ is represented as a ratio ($=Woutbl/Winbl$) of a secondary balance thrust Woutbl to a primary balance thrust Winbl, wherein the secondary balance thrust Woutbl is the balance thrust Wbl of the secondary pulley 64 and the primary balance thrust Winbl is the balance thrust Wbl of the primary pulley 60. On the other hand, in the steady state, if one of the thrusts applied to the respective pulleys 60, 64 is increased or reduced by a certain amount, the steady state is lost whereby the gear ratio $\gamma cvt$ is changed thereby generating the shifting speed $d\gamma$ that corresponds to the certain amount by which the one of the thrusts is increased or reduced. The certain amount, by which the thrust is increased or reduced, will be referred to as "gear-ratio changing thrust $\Delta W$" that is referred also to as "transient thrust". Where the gear ratio $\gamma cvt$ is changed to the target gear ratio $\gamma cvttgt$ by changing the thrust applied to the primary pulley 60, the gear-ratio changing thrust $\Delta W$ is represented by a primary gear-ratio changing thrust $\Delta Win$ that corresponds to an amount by which the thrust applied to the primary pulley 60 is increased or reduced. Where the gear ratio $\gamma cvt$ is changed to the target gear ratio $\gamma cvttgt$ by changing the thrust applied to the secondary pulley 64, the gear-ratio changing thrust $\Delta W$ is represented by a secondary gear-ratio changing thrust $\Delta Wout$ that corresponds to an amount by which the thrust applied to the secondary pulley 64 is increased or reduced.

Where one of the primary-side shifting-control thrust Winsh and secondary-side shifting-control thrust Woutsh, which are thrusts required to be applied to the respective primary and secondary pulleys 60, 64 in a shifting control, has been set, the other of the primary-side shifting-control thrust Winsh and secondary-side shifting-control thrust Woutsh is set to a sum of the balance thrust Wbl and the gear-ratio changing thrust $\Delta W$, wherein the balance thrust Wbl is dependent on the above-described one of the primary-side shifting-control thrust Winsh and secondary-side shifting-control thrust Woutsh and the thrust ratio $\tau$ corresponding to the target gear ratio $\gamma cvttgt$, and the gear-ratio changing thrust $\Delta W$ corresponds to the target shifting speed $d\gamma tgt$ of change of the target gear ratio $\gamma cvttgt$. The target shifting speed $d\gamma tgt$ is represented by a primary target shifting speed $d\gamma intgt$ and a secondary target shifting speed $d\gamma outtgt$. The primary gear-ratio changing thrust $\Delta Win$ is a positive value ($\Delta Win>0$) that is larger than zero in a shift-up state in which the gear ratio $\gamma cvt$ is to be reduced, and is a negative value ($\Delta Win<0$) that is smaller than zero in a shift-down state in which the gear ratio $\gamma cvt$ is to be increased. The primary gear-ratio changing thrust $\Delta Win$ is zero ($\Delta Win=0$) in a steady state in which the gear ratio $\gamma cvt$ is constant. Further, the secondary gear-ratio changing thrust $\Delta Wout$ is a negative value ($\Delta Wout<0$) that is smaller than zero in the shift-up state, and is a positive value ($\Delta Wout>0$) that is larger than zero in the shift-down state. The secondary gear-ratio changing thrust $\Delta Wout$ is zero ($\Delta Wout=0$) in the steady state.

Figure 3:
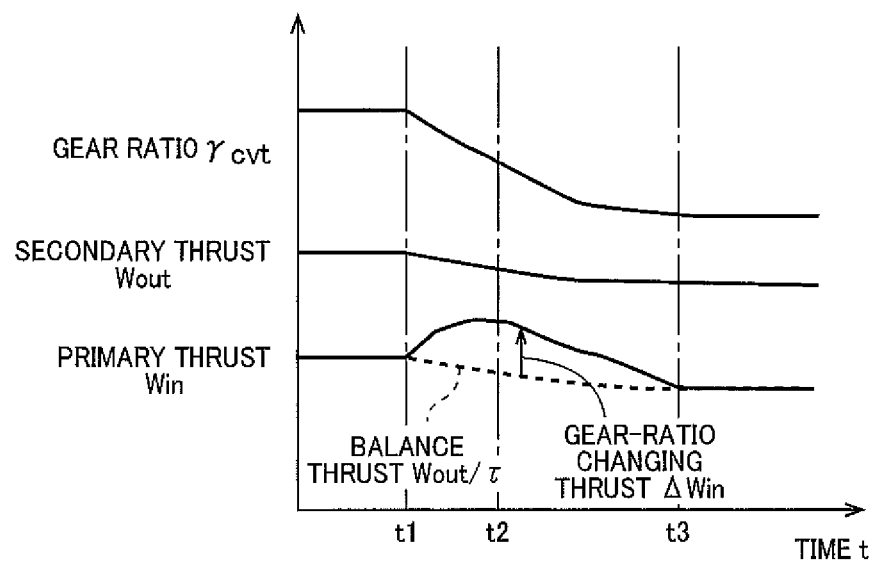
FIG. 3 is a view showing an example for explaining thrusts required for a shifting control.
Figure 4:
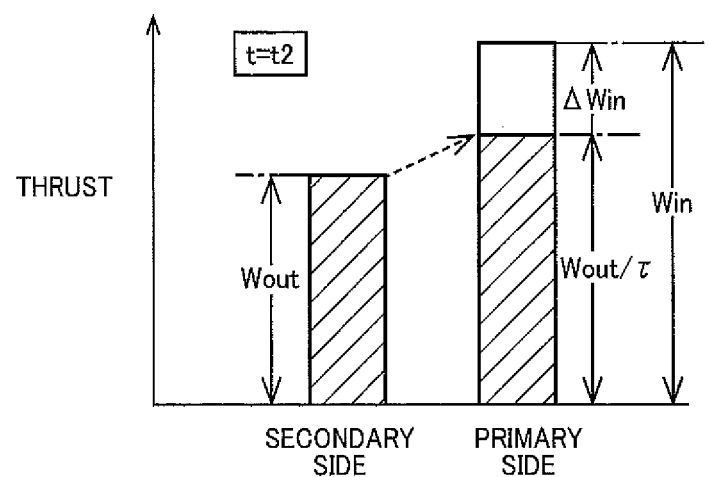
FIG. 4 is a view showing, by way of example, a relationship between the thrusts at a point t2 of time shown in FIG. 3.

FIG. 3 is a view showing an example for explaining thrusts required for a shifting control. FIG. 4 is a view showing, by way of example, a relationship between the thrusts at a point t2 of time shown in FIG. 3. FIGS. 3 and 4 show, by a way of example, the primary thrust Win that is set in a case where a desired shift-up action is executed by increasing the primary thrust Win while setting the secondary thrust Wout to prevent a belt slippage on the secondary pulley 64. As shown in FIG. 3, at a stage until a point t1 of time and a stage from a point t3 of time, namely, in the steady state in which the target gear ratio γcvttgt is constant with the primary gear-ratio changing thrust ΔWin is zero, the primary thrust Win consists of only the primary balance thrust Winbl (=Wout/τ). At a stage from the point t1 of time until the point t3 of time, namely, in the shift-up state in which the target gear ratio γcvttgt is reduced, the primary thrust Win corresponds to a sum of the primary balance thrust Winbl and the primary gear-ratio changing thrust ΔWin, as shown in FIG. 4. In FIG. 4, a hatched portion of each of the primary and secondary thrusts Win, Wout corresponds to a corresponding one of the primary and secondary balance thrusts Winbl, Woutbl that are required at the point t2 of time shown in FIG. 3 to maintain the target gear ratio γcvttgt.

Figure 5:
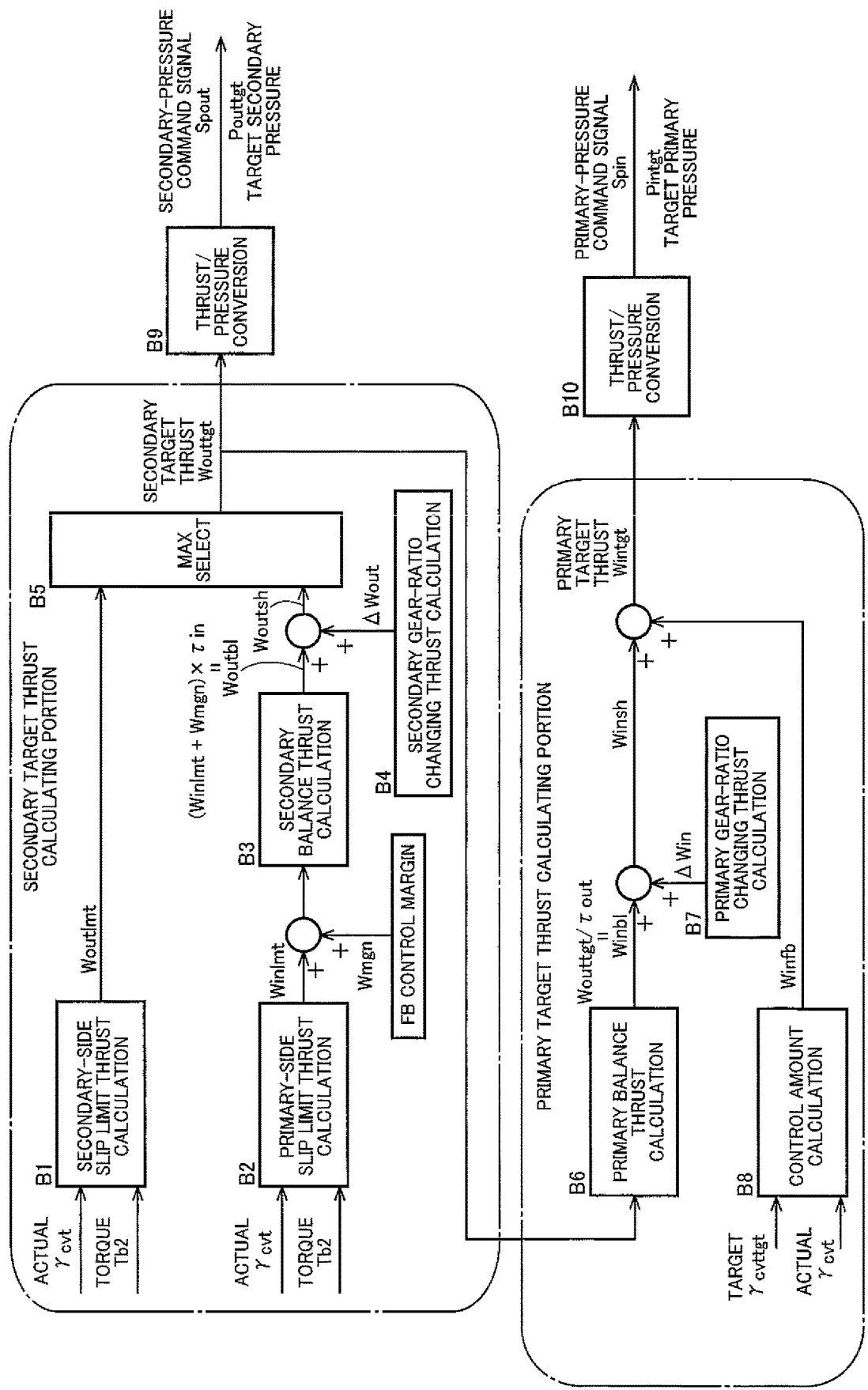
FIG. 5 is a block diagram showing an arrangement for controls performed to prevent a belt slippage and establish a target gear ratio, with minimally required thrusts.

FIG. 5 is a block diagram showing an arrangement for controls performed to execute a desired shifting action and prevent a belt slippage, with minimally required thrusts, and is for explaining a CVT hydraulic control operation as the hydraulic control operation executed in the continuously-variable transmission mechanism 24.

In FIG. 5, the transmission shifting control portion 94 calculates the target gear ratio γcvttgt. Specifically, the transmission shifting control portion 94 calculates the target primary rotational speed Npritgt by applying the accelerator operation amount θacc and the vehicle running speed V into a predetermined relationship in the form of a CVT shifting map. Then, the transmission shifting control portion 94 calculates, based on the target primary rotational speed Npritgt, a post-shifting target gear ratio γcvttgtl (=Npritgt/Nsec) that is the gear ratio γcvt to be established after the shifting action executed in the continuously-variable transmission mechanism 24. In order that the shifting action is executed rapidly and smoothly, the transmission shifting control portion 94 determines the target gear ratio γcvttgt as a transient target value of the gear ratio γcvt in process of the shifting action, based on a pre-shifting gear ratio γcvt (i.e., gear ratio γcvt before the shifting action) and the post-shifting target gear ratio γcvttgtl, according to a relationship predetermined to cause the shifting action to be executed rapidly and smoothly. For example, the transmission shifting control portion 94 determines the target gear ratio γcvttgt (that is to be changed in process of the shifting action) as a function that is changed, along a curved line whose inclination is smoothly changed, toward the post-shifting target gear ratio γcvttgtl, with lapse of time from initiation of the shifting action. This smoothly curved line is, for example, a first-order lag curve or a second-order lag curve. When determining the target gear ratio γcvttgt, the shifting control portion 94 calculates the target shifting speed dγtgt, based on the target gear ratio γcvttgt as the time function. When the target gear ratio γcvttgt becomes constant upon completion of the shifting action, namely, when the continuously-variable transmission mechanism 24 is brought back into the steady state, the shifting speed dγtgt becomes zero.

The transmission shifting control portion 94 calculates an input torque inputted to the continuously-variable transmission mechanism 24, which is to be used in calculations of the primary target thrust Wintgt and secondary target thrust Wouttgt. More precisely, the transmission shifting control portion 94 calculates, as the input torque, a first input torque (first belt-portion input torque) that is to be used in calculation of the thrust ratio τ for establishing the target gear ratio γcvttgt of the continuously-variable transmission mechanism 24 and a second input torque (second belt-portion input torque) that is to be used in calculation of the primary-side slip limit thrust Winlmt and the secondary-side slip limit thrust Woutlmt. In the following descriptions relating to the present embodiment, the first input torque will be referred to as "thrust-ratio-calculation input torque Tb1" and the second input torque will be referred to as "belt-slippage-prevention input torque Tb2".

Specifically, the transmission-shifting control portion 94 calculates an estimated value of the engine torque Te, for example, by applying the throttle opening degree tap and the engine rotational speed Ne to a predetermined relationship such as an engine torque map. The transmission-shifting control portion 94 calculates a turbine torque Tt, based on the estimated value of the engine torque Te and a predetermined relationship such as characteristic of the torque converter 20. The calculated turbine torque Ti is an estimated value of the input torque inputted to the continuously-variable transmission mechanism 24. The transmission-shifting control portion 94 handles or regards the turbine torque Tt as the thrust-ratio-calculation input torque Tb1.

Basically, the thrust-ratio-calculation input torque Tb1 may be handled as the belt-slippage-prevention input torque Tb2. However, in view of variation or the like, it is not preferable that the slip limit thrust Wlmt is set to zero when the thrust-ratio-calculation input torque Tb1 is zero. Therefore, as the belt-slippage-prevention input torque Tb2, a torque value, which is obtained through a lower-limit guard processing applied to an absolute value of the thrust-ratio-calculation input torque Tb1, is used. The transmission-shifting control portion 94 selects, as the belt-slippage-prevention input torque Tb2, a larger one of the absolute value of the thrust-ratio-calculation input torque Tb1 and a minimally required torque Tblim. The minimally required torque Tblim is a positive value that is predetermined as a lower limit value, for increasing the belt-slippage-prevention input torque Tb2 so as to more reliably prevent a belt slippage in view of a variation. It is noted that, when the thrust-ratio-calculation input torque Tb1 is a negative vale, a torque value dependent on the thrust-ratio-calculation input torque Tb1 may be used as the belt-slippage-prevention input torque Tb2, in view of a low torque accuracy (i.e., low accuracy of an obtained value of each torque). This torque value dependent on the thrust-ratio-calculation input torque Tb1 is, for example, a positive value that is larger than an absolute value of the thrust-ratio-calculation input torque Tb1. Thus, the belt-slippage-prevention input torque Tb2 is a torque value that is based on the thrust-ratio-calculation input torque Tb1.

At each of blocks B1 and B2 shown in FIG. 5, the transmission shifting control portion 94 calculates the slip limit thrust Wlmt, based on the actual gear ratio γcvt and the belt-slippage-prevention input torque Tb2. Specifically, the transmission shifting control portion 94 calculates the secondary-side slip limit thrust Woutlmt, by using equation (1) given below, and calculates the primary-side slip limit thrust Winlmt, by using equation (2). In the equations (1) and (2), "Tb2" represents the belt-slippage-prevention input torque Tb2; "Tout" represents a torque (=γcvt*Tb2=(Rout/Rin)*Tb2) that is obtained by multiplying the belt-slippage-prevention input torque Tb2 by the gear ratio γcvt; "a" represents a sheave angle of each of the pulleys 60, 64 (see FIG. 2), "μm" represents an element/pulley friction coefficient in the primary pulley 60 (i.e., friction coefficient between the transmission belt 66 and the primary pulley 60), "μout" represents an element/pulley friction coefficient in the secondary pulley 64 (i.e., friction coefficient between the transmission belt 66 and the secondary pulley 64), "Rin" represents ½ of the belt winding diameter (effective diameter) of the primary pulley 60, which is uniquely calculated based on the actual gear ratio γcvt (see FIG. 2), and "Rout" represents ½ of the belt winding diameter (effective diameter) of the secondary pulley 64, which is uniquely calculated based on the actual gear ratio γcvt (see FIG. 2).

$$Woutlmt=(Tout*\cos\alpha)/(2*\mu out*Rout)=(Tb2*\cos\alpha)/(2*\mu out*Rin) \quad (1)$$

$$Winlmt=(Tb2*\cos\alpha)/(2*\mu in*Rin) \quad (2)$$

As the slip limit thrust Wlmt, a value obtained through a lower-limit guard processing applied to the calculated slip limit thrust Wlmt is used. The transmission-shifting control portion 94 selects, as the primary-side slip limit thrust Winlmt to be used at block B3 shown in FIG. 5, a larger one of the primary-side slip limit thrust Winlmt (that is calculated in the above equation (2)) and a primary-side minimum thrust Winmin. The primary-side minimum thrust Winmin is a hard limit minimum thrust which is to be applied to the primary pulley 60 and which includes a thrust generated as a control variation amount of the primary pressure Pin and a thrust generated by a centrifugal hydraulic pressure in the primary hydraulic actuator 60c. The control variation amount of the primary pressure Pin is a predetermined maximum value of the primary pressure Pin, which could be supplied from the hydraulic control unit 46 into the hydraulic actuator 60c even when the primary-pressure command signal Spin requesting the primary pressure Pin to be zero. Substantially the same description is applied to the secondary-side slip limit thrust Woutlmt as well.

At each of blocks B3 and B6 shown in FIG. 5, the transmission shifting control portion 94 calculates the balance thrust Wbl. That is, the transmission shifting control portion 94 calculates the secondary balance thrust Woutbl based on the primary-side slip limit thrust Winlmt, and calculates the primary balance thrust Winbl based on the secondary target thrust Wouttgt.

Figure 6:
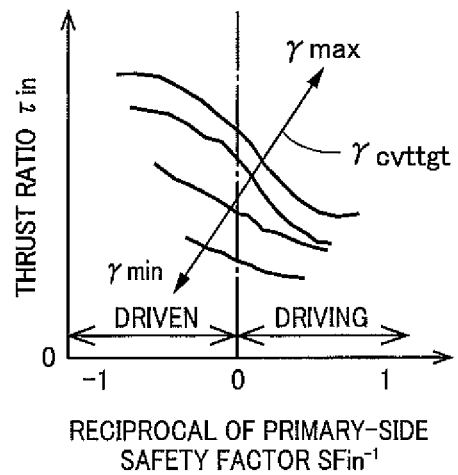
FIG. 6 is a view showing, by way of example, a thrust ratio map for calculating a thrust ratio, which is used to calculate the thrust to be applied to a secondary pulley.
Figure 7:
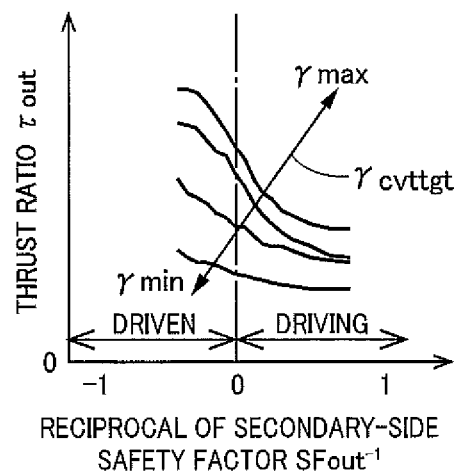
FIG. 7 is a view showing, by way of example, a thrust ratio map for calculating a thrust ratio, which is used to calculate the thrust to be applied to a primary pulley.

Specifically, the transmission shifting control portion 94 calculates a thrust ratio τin that corresponds to or establishes the target gear ratio γcvttgt, for example, by applying the target gear ratio γcvttgt and a reciprocal SFin$^{-1}$ (=Winlmt/Win) of a primary-side safety factor SFin (=Win/Winlmt) to a thrust ratio map (τin) shown in FIG. 6. The thrust ratio map (τin) is a predetermined relationship between the reciprocal SFin$^{-1}$ of the primary-side safety factor SFin and the thrust ratio τin, with a parameter in the form of the target gear ratio γcvttgt. The thrust ratio τin is a secondary-thrust calculation thrust ratio that is used to calculate the thrust applied to the secondary pulley 64, based on the thrust applied to the primary pulley 60. The transmission shifting control portion 94 calculates the secondary balance thrust Woutbl based on the primary-side slip limit thrust Winlmt and the thrust ratio τin, by using equation (3) given below. The primary-side safety factor SFin is represented by, for example, "Win/Winlmt" or "Tb2/Tb1", and the reciprocal SFin$^{-1}$ of the primary-side safety factor SFin is represented by, for example, "Winlmt/Win" or "Tb1/Tb2". Further, the transmission shifting control portion 94 calculates a thrust ratio τout that corresponds to or establishes the target gear ratio γcvttgt, for example, by applying the target gear ratio γcvttgt and a reciprocal SFout$^{-1}$(=Woutlmt/Wout) of a secondary-side safety factor SFout (=Wout/Woutlmt) to a thrust ratio map (τout) shown in FIG. 7. The thrust ratio map (τout) is a predetermined relationship between the reciprocal SFout$^{-1}$ of the secondary-side safety factor SFout and the thrust ratio τout, with a parameter in the form of the target gear ratio γcvttgt. The thrust ratio τout is a primary-thrust calculation thrust ratio that is used to calculate the thrust applied to the primary pulley 60, based on the thrust applied to the secondary pulley 64. The transmission shifting control portion 94 calculates the primary balance thrust Winbl based on the secondary target thrust Wouttgt and the thrust ratio τout, by using equation (4) given below. The secondary-side safety factor SFout is represented by, for example, "Wout/Woutlmt" or "Tb2/Tb1", and the reciprocal SFout$^{-1}$ of the secondary-side safety factor SFout is represented by, for example, "Woutlmt/Wout" or "Tb1/Tb2". Since the belt-slippage-prevention input torque Tb2 is always a positive value, when the vehicle 10 is in a driving state (i.e., a state in which the vehicle 10 drives itself) in which the thrust-ratio-calculation input torque Tb1 is a positive value, a driving-state range of the thrust ratio τ is used, because each of the reciprocals SFin$^{-1}$, SFout$^{-1}$ of the respective safety factors SFin, SFout is also a positive value when the vehicle 10 is in the driving state. On the other hand, when the vehicle 10 is in a driven state in which the thrust-ratio-calculation input torque Tb1 is a negative value, a driven-state range of the thrust ratio τ is used, because each of the reciprocals SFin$^{-1}$, SFout$^{-1}$ of the respective safety factors SFin, SFout is also a negative value when the vehicle 10 is in the driven state. Each of the reciprocals SFin$^{-1}$, SFout$^{-1}$ may be calculated each time when the balance thrust Wbl is to be calculated. Or alternatively, where each of the safety factors SFin, SFout is set to a predetermined value (e.g., about 1.0-1.5), each of the reciprocals SFin$^{-1}$, SFout$^{-1}$ may be reciprocals of such safety factor set to the predetermined value.

$$Woutbl=Winlmt*\tau in \quad (3)$$

$$Winbl=Wouttgt/\tau out \quad (4)$$

As described above, each of the slip limit thrusts Winlmt, Woutlmt is calculated based on the belt-slippage-prevention input torque Tb2 that is based on the thrust-ratio-calculation input torque Tb1. The reciprocals SFin$^{-1}$, SFout$^{-1}$ of the respective safety factors SFin, SFout, based on which the thrust ratios τin, τout are calculated, are values based on the thrust-ratio-calculation input torque Tb1. Therefore, the transmission shifting control portion 94 calculates, based on the thrust-ratio-calculation input torque Tb1, the thrust ratio τ that corresponds to or establishes the target gear ratio γcvttgt of the continuously-variable transmission mechanism 24.

At each of blocks B4 and B7 shown in FIG. 5, the transmission shifting control portion 94 calculates the gear-ratio changing thrust ΔW. That is, the transmission shifting control portion 94 calculates the secondary gear-ratio changing thrust ΔWout and the primary gear-ratio changing thrust ΔWin.

Figure 8:
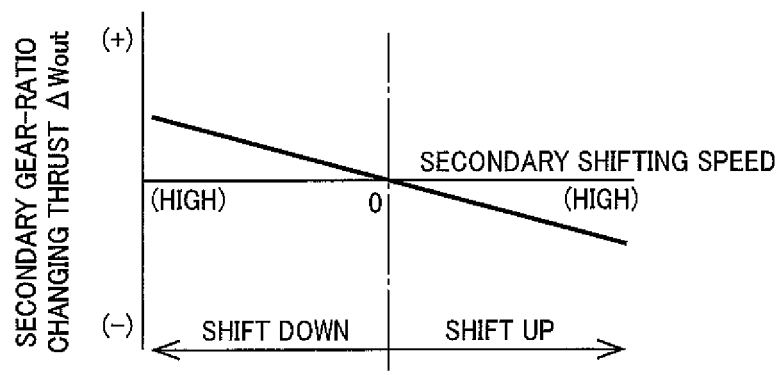
FIG. 8 is a view showing, by way of example, a gear-ratio-changing thrust map for calculating a secondary gear-ratio changing thrust.
Figure 9:
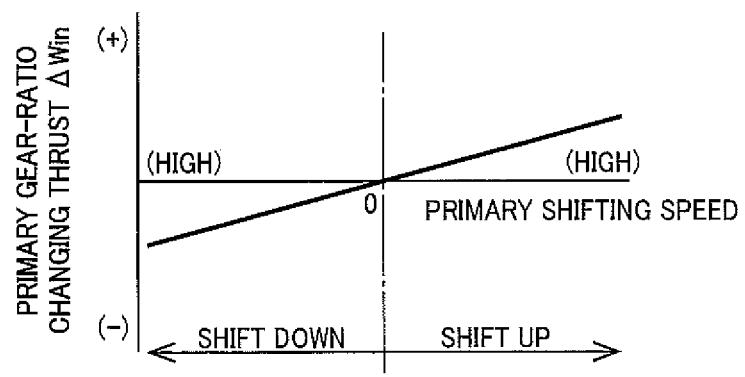
FIG. 9 is a view showing, by way of example, a gear-ratio-changing thrust map for calculating a primary gear-ratio changing thrust.

Specifically, the transmission shifting control portion 94 calculates the secondary gear-ratio changing thrust ΔWout, for example, by applying the secondary target shifting speed dγouttgt to a gear-ratio-changing thrust map (ΔWout) shown in FIG. 8. The gear-ratio-changing thrust map (ΔWout) represents, by way of example, a predetermined relationship between the secondary shifting speed dγout and the secondary gear-ratio changing thrust ΔWout. The transmission shifting control portion 94 calculates, as the secondary thrust required to prevent a belt slippage on the primary pulley 60, a secondary-side shifting-control thrust Woutsh (=Woutbl+ ΔWout), by adding the secondary gear-ratio changing thrust ΔWout to the secondary balance thrust Woutbl. Further, the transmission shifting control portion 94 calculates the primary gear-ratio changing thrust ΔWin, for example, by applying the primary target shifting speed dγintgt to a gear-ratio-changing thrust map (ΔWin) shown in FIG. 9. The gear-ratio-changing thrust map (ΔWin) represents, by way of example, a predetermined relationship between the primary shifting speed dγin and the primary gear-ratio changing thrust ΔWin. The transmission shifting control portion 94 calculates a primary-side shifting-control thrust Winsh (=Winbl+ΔWin), by adding the primary gear-ratio changing thrust ΔWin to the primary balance thrust Winbl.

In calculations made at the above-described blocks B3 and B4, a predetermined physical characteristic diagram such as the thrust ratio map (τin) shown in FIG. 6 and the gear-ratio-changing thrust map (ΔWout) shown in FIG. 8 is used. Therefore, in a result of calculation of each of the secondary balance thrust Woutbl and the secondary gear-ratio changing thrust ΔWout, there exists a variation that is dependent on an individual difference of a hard unit such as the hydraulic control unit 46 in terms of physical characteristics. Where such a variation in terms of the physical characteristics is taken into consideration, the shifting control portion 94 may add a control margin Wmgn to the primary-side slip limit thrust Winlmt. The control margin Wmgn is a predetermined thrust that corresponds to the variation in terms of the physical characteristics which could affect the calculation of each of the secondary balance thrust Woutbl and the secondary gear-ratio changing thrust ΔWout. Where the variation in terms of the physical characteristics is taken into consideration, the transmission-shifting control portion 94 calculates the secondary balance thrust Woutbl by using an equation "Woutbl=(Winlmt+Wmgn)·τin" shown in FIG. 5 in place of the above-described equation (3). It is noted that the calculation could be affected by the variation in terms of the physical characteristics as well as the variation in term of an actual value of the pulley hydraulic-pressure that is generated in response to the hydraulic-control command signal Scvt, and that the calculation could be affected by the variation in terms of the physical characteristics by a degree, which could be relatively large depending on a kind of hard unit (such as the hydraulic control unit 46) having the individual difference. However, in general, the degree by which the calculation could be affected by the variation in the physical characteristics is extremely small as compared with a degree by which the calculation could be affected by the variation in the actual value of the pulley hydraulic-pressure.

At block B5 shown in FIG. 5, the transmission shifting control portion 94 selects, as the secondary target thrust Wouttgt, a larger one of the secondary-side slip limit thrust Woutlmt and the secondary-side shifting-control thrust Woutsh.

At block B8 shown in FIG. 5, the transmission shifting control portion 94 calculates a feedback control amount Winfb. Specifically, the transmission shifting control portion 94 calculates a feedback control amount (=FB control amount) Winfb that makes the actual gear ratio γcvt coincident with the target gear ratio γcvttgt, by using a feedback-control formula in the form of equation (5) given below. In the equation (5), "Δγcvt" represents the gear ratio deviation Δγcvt, "Kp" represents a predetermined proportionality constant, "Ki" represents a predetermined integral constant, and "Kd" represents a predetermined differential constant. The transmission shifting control portion 94 calculates, as the primary target thrust Wintgt, an amended value (=Winsh+ Winfb) of the feedback control amount Winfb that is amended by a feedback control, by adding the feedback control amount Winfb to the primary-side shifting-control thrust Winsh.

$$Winfb = Kp^* \Delta\gamma cvt + Ki^* (\int \Delta\gamma cvt dt) + Kd^* (d\Delta\gamma cvt/dt) \quad (5)$$

At each of blocks B9 and B10 shown in FIG. 5, the transmission shifting control portion 94 converts the target thrust into a target pulley pressure. Specifically, the transmission shifting control portion 94 converts the primary target thrust Wintgt into a target primary pressure Pintgt (=Wintgt/pressure receiving area), based on the pressure receiving area of the primary hydraulic actuator 60c, and converts the secondary target thrust Wouttgt into a target secondary pressure Pouttgt (=Wouttgt/pressure receiving area), based on the pressure receiving area of the secondary hydraulic actuator 64c. The transmission shifting control portion 94 sets the primary-pressure command signal Spin representing the target primary pressure Pintgt and the secondary-pressure command signal Spout representing the target secondary pressure Pouttgt.

The transmission shifting control portion 94 supplies the hydraulic-control command signal Scvt in the form of the primary-pressure command signal Spin and the secondary-pressure command signal Spout, to the hydraulic control unit 46, for thereby obtaining the target primary pressure Pintgt and the target secondary pressure Pouttgt. The hydraulic control unit 46 regulates the primary pressure Pin and the secondary pressure Pout, in accordance with the supplied hydraulic-control command signal Scvt.

In the drive-force transmitting apparatus 16, the operation state of the second clutch C2 is to be switched among a plurality of states depending on, for example, the running mode of the vehicle 10, wherein the plurality of states include at least four states consisting of a fully released state, a fully engaged state, a releasing process state and an engaging process state. The second clutch C2 is placed in the fully engaged state during the belt running mode, and is placed in the fully released state during the gear running mode. Further, during the switching control operation executed for switching the running mode between the gear running mode and the belt running mode, the second clutch C2 is temporarily placed in the releasing process state or the engaging process state. Moreover, during a garage operation that is executed by operation of the shift lever 84 between the neutral position N and the drive position D, too, the second clutch C2 is temporarily placed in the releasing process state or the engaging process state. The input torque inputted to the continuously-variable transmission mechanism 24 is changed with change of the operation state of the second clutch C2. That is, the input torque inputted to the continuously-variable transmission mechanism 24 is dependent on the operation state of the second clutch C2.

It is preferable to establish the target gear ratio γcvttgt of the continuously-variable transmission mechanism 24 while preventing a belt slippage in the continuously-variable transmission mechanism 24, not only in a belt-running-mode situation in which the vehicle 10 is running in the belt running mode, but also in other situations other than the belt-running-mode situation. To this end, the transmission shifting control portion 94 calculates the input torque inputted to the continuously-variable transmission mechanism 24, which is used in calculation of the primary target thrust Wintgt and the secondary target thrust Wouttgt, depending on the operation state of the second clutch C2. That is, the transmission shifting control portion 94 calculates the thrust-ratio-calculation input torque Tb1 and the belt-slippage-prevention input torque Tb2, depending on the operation state of the second clutch C2. For example, when the second clutch C2 is in the fully engaged state, the turbine torque Tt is handled or regarded as the thrust-ratio-calculation input torque Tb1, and a larger one of the absolute value of the thrust-ratio-calculation input torque Tb1 and the minimally required torque Tblim is handled or regarded as the belt-slippage-prevention input torque Tb2, as in a method of calculation of the primary target thrust Wintgt and secondary target thrust Wouttgt, which has been described above, by way of example, when the vehicle 10 is in the belt running mode. Namely, when the second clutch C2 is in the fully engaged state, the transmission shifting control portion 94 sets the turbine torque Tt as the thrust-ratio-calculation input torque Tb1, and sets the larger one of the absolute value of the turbine torque Tt and the minimally required torque Tblim, as the belt-slippage-prevention input torque Tb2. Further, when the second clutch C2 is in the releasing process state or in the engaging process state, the transmission-shifting control portion 94 handles or regards a converted value of the C2 clutch torque Tcltc2 converted on the primary shaft 58, i.e., on the input shaft 22, as the thrust-ratio-calculation input torque Tb1, namely, sets the converted value as the thrust-ratio-calculation input torque Tb1. The C2 clutch torque Tcltc2 is calculated based on, for example, the C2 command pressure value. Further, when the second clutch C2 is fully released, the transmission-shifting control portion 94 sets the thrust-ratio-calculation input torque Tb1 to zero, for example. Regarding the belt-slippage-prevention input torque Tb2, the transmission-shifting control portion 94 sets the belt-slippage-prevention input torque Tb2 to a larger one of the absolute value of the thrust-ratio-calculation input torque Tb1 and the minimally required torque Tblim, not only when the second clutch C2 is in the fully engaged state but also when the second clutch C2 in the other states.

As described above, each of the thrust-ratio-calculation input torque Tb1 and belt-slippage-prevention input torque Tb2 is calculated to a value that is dependent on the operation state of the second clutch C2. Therefore, the operation state of the second clutch C2 needs to be accurately determined, for preventing a belt slippage and assuring a high followability of the actual gear ratio γ with respect to the target gear ratio γcvttgt in the continuously-variable transmission mechanism 24.

The electronic control apparatus 90 further includes an operation-state determining means or portion in the form of an operation-state determining portion 96, for performing control operations to accurately determine the operation state of the second clutch C2.

The operation-state determining portion 96 determines which one of the four states (that consist of the fully released state, fully engaged state, releasing process state and engaging process state) is established as the operation state of the second clutch C2, by determining whether a plurality of transition-completion conditions, each of which is to be satisfied to determine that a transition of the operation state of the second clutch C2 to a corresponding one of the four states from another of the four states has been completed, are satisfied or not, based on (a) a state of the hydraulic control executed to control the hydraulic pressure supplied to the second clutch C2 and (β) a rotational speed difference ΔNc2 of the second clutch C2. That is, the operation-state determining portion 96 determines in which one of the four states the second clutch C2 is placed, depending on a result of the determination as to which one of the plurality of transition-completion conditions is satisfied. The operation-state determining portion 96 obtains or determines the state of the hydraulic control executed for the second clutch C2, based on the hydraulic-control command signal Scbd. Further, the operation-state determining portion 96 calculates the rotational speed difference ΔNc2 (=Nsec−Nout) in the second clutch C2, based on the secondary rotational speed Nsec and the output-shaft rotational speed Nout. In the following descriptions relating to the present embodiment, the rotational speed difference ΔNc2 in the second clutch C2 will be referred to as "C2 rotational speed difference ΔNc2".

The state of the hydraulic control executed for the second clutch C2 is represented by, for example, a tendency that the hydraulic pressure (C2 cutch pressure Pc2) supplied to the second clutch C2 is being increased or reduced and/or a level of a command value of the C2 clutch pressure Pc2 supplied to the second clutch C2 in the hydraulic control. The C2 rotational speed difference ΔNc2 corresponds to an actual state representing how the second clutch C2 is actually operated.

The above-described hydraulic control is executed to engage or release the second clutch C2, by controlling the hydraulic pressure supplied to the second clutch C2. In the following descriptions of the present embodiment, the hydraulic control will be referred to as "C2 engaging hydraulic control" when the hydraulic control is executed to engage the second clutch C2, and will be referred to as "C2 releasing hydraulic control" when the hydraulic control is executed to release the second clutch C2. Further, in the following descriptions relating to the present embodiment, an actual value of the hydraulic pressure (C2 cutch pressure Pc2) actually supplied to the second clutch C2 from the hydraulic control unit 46 will be referred to as "C2 actual pressure value". It is noted that the command pressure value, which is represented by the hydraulic-control command signal Scbd, and to which the C2 clutch pressure Pc2 of the second clutch C2 is regulated, is the C2 command pressure value, as described above.

The C2 engaging hydraulic control is executed, for example, when a first state of the drive-force transmitting apparatus 16 in which the first drive-force transmitting path PT1 is established is to be switched to a second state of the drive-force transmitting apparatus 16 in which the second drive-force transmitting path PT2 is established. When being executed to switch from the first state of the drive-force transmitting apparatus 16 to the second state of the drive-force transmitting apparatus 16, the C2 engaging hydraulic control constitutes a part of the switching control operation, which is executed for switching the running mode from the gear running mode to the belt running mode, by performing a so-called "clutch to clutch" shifting operation so as to release and engage the first and second clutches C1, C2, respectively. Further, the C2 engaging hydraulic control is executed, for example, when the neutral state of the drive-force transmitting apparatus 16 is to be switched to the second state of the drive-force transmitting apparatus 16 in which the second drive-force transmitting path PT2 is established. When being executed to switch from the neutral state to the drive-force transmitting apparatus 16 to the second state of the drive-force transmitting apparatus 16, the C2 engaging hydraulic control constitutes a garage engaging control, which is executed for engaging the second clutch C2, in response to a garage operation executed by operation of the shift lever 84 from the neutral position N to the drive position D in the belt running mode.

The C2 releasing hydraulic control is executed, for example, when the second state of the drive-force transmitting apparatus 16 in which the second drive-force transmitting path PT2 is established is to be switched to the first state of the drive-force transmitting apparatus 16 in which the first drive-force transmitting path PT1 is established. When being executed to switch from the second state of the drive-force transmitting apparatus 16 to the first state of the drive-force transmitting apparatus 16, the C2 releasing hydraulic control constitutes a part of the switching control operation, which is executed for switching the running mode from the belt running mode to the gear running mode, by performing a so-called "clutch to clutch" shifting operation so as to release the second clutch C2 and engage the first clutch C1. Further, the C2 releasing hydraulic control is executed, for example, when the second state of the drive-force transmitting apparatus 16 in which the second drive-force transmitting path PT2 is established is to be switched to the neutral state of the drive-force transmitting apparatus 16. When being executed to switch from the second state of the drive-force transmitting apparatus 16 to the neutral state to the drive-force transmitting apparatus 16, the C2 releasing hydraulic control constitutes a garage releasing control, which is executed for releasing the second clutch C2, in response to a garage operation executed by operation of the shift lever 84 from the drive position D to the neutral position N in the belt running mode.

Figure 10:
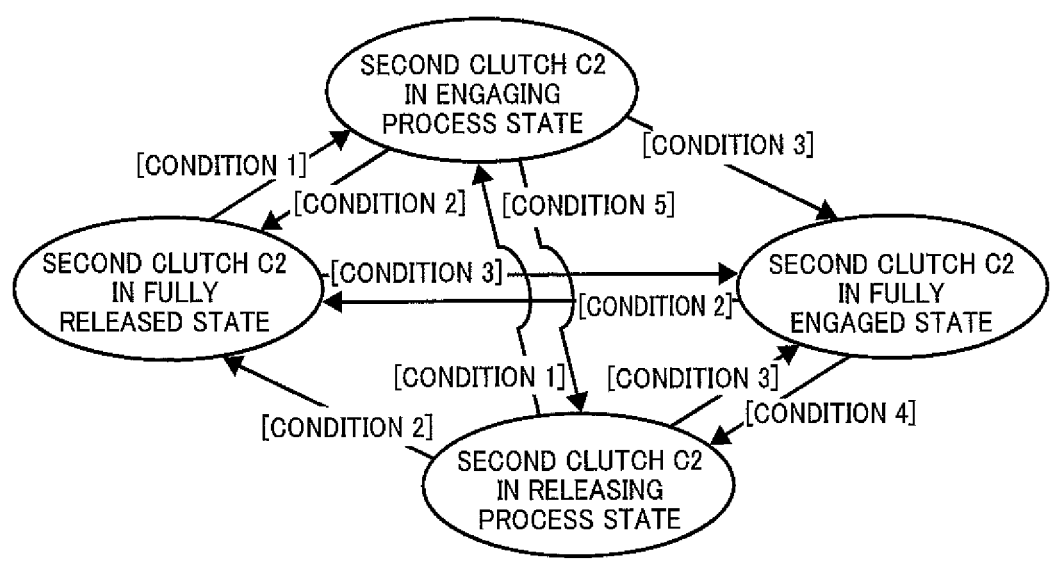
FIG. 10 is a state-transition diagram showing an operation state of the second clutch that is to be switched among four states in the form of a fully released state, a fully engaged state, a releasing process state and an engaging process state, and a plurality of transition-completion conditions each of which is required to determine that a transition of the operation state of the second clutch to a corresponding one of the four states from another of the four states has been completed.

FIG. 10 is a state-transition diagram showing the operation state of the second clutch C2 that is to be switched among four states in the form of the fully released state, fully engaged state, releasing process state and engaging process state, and the plurality of transition-completion conditions each of which is required to determine that a transition of the operation state of the second clutch C2 to a corresponding one of the four states from another of the four states has been completed. Namely, the state-transition diagram of FIG. 10 shows relationship between the operation state of the second clutch C2 and the transition-completion conditions. It is noted that the state-transition diagram of FIG. 10 is also for explaining a main part of a control operation executed by the electronic control apparatus 90, namely, a control operation that is executed for determining the operation state of the second clutch C2 with improved accuracy.

As shown in FIG. 10, when the second clutch C2 had been in the fully released state or releasing process state, if [CONDITION 1] (corresponding to "first condition") as one of the transition-completion conditions is satisfied, it is determined that the operation state of the second clutch C2 has been switched to the engaging process state, namely, the engaging process state is established as the operation state of the second clutch C2. In process of engagement of the second clutch C2 in the C2 engaging hydraulic control, an actual output of the hydraulic pressure to the second clutch C2 is increased with delay in response to an increase of the C2 command pressure value, so that a relationship represented by "C2 command pressure value >C2 actual pressure value" is assured. Further, when it is determined that the second clutch C2 is in placed in the engaging process state, the thrust-ratio-calculation input torque Tb1 is set to a torque value corresponding to the C2 clutch torque Tcltc2 that is calculated based on the C2 command pressure value. Thus, even where it is determined that the operation state of the second clutch C2 has been switched to the engaging process state, by only a fact that the C2 engaging hydraulic control is being executed, it is possible to assure the belt torque capacity Tcvt.

Therefore, the above-described [CONDITION 1] is that the C2 engaging hydraulic control is operated, namely, the hydraulic-control command signal Scbd for executing the C2 engaging hydraulic control is outputted. When the second clutch C2 had been in the fully released state or in the releasing process state, if the [CONDITION 1], which is that the C2 engaging hydraulic control is operated, is satisfied, the operation-state determining portion 96 determines that the operation state of the second clutch C2 has been switched to the engaging process state, namely, the engaging process state is established as the operation state of the second clutch C2.

When the second clutch C2 had been in the fully engaged state, releasing process state or engaging process state, if [CONDITION 2] (corresponding to "second condition") as one of the transition-completion conditions is satisfied, it is determined that the operation state of the second clutch C2 has been switched to the fully released state, namely, the fully released state is established as the operation state of the second clutch C2. As long as, in addition to the fact that the C2 releasing hydraulic control is executed, the C2 rotational speed difference ΔNc2 has become large with the C2 command pressure value in the C2 releasing hydraulic control being not higher than a pressure value that causes the second clutch C2 to be placed in the fully released state, there is unlikely to be a problem even if it is determined that the operation state of the second clutch C2 has been switched to the fully released state. However, this determination can be made when the input-shaft rotational speed Nin (=primary rotational speed Npri=rotational speed of turbine impeller 20t) as the input rotational speed of the continuously-variable transmission mechanism 24 is in a high speed range. When the input-shaft rotational speed Nin is in a low range, the C2 rotational speed difference ΔNc2 could be difficult to be detected. For example, when the switching control operation is executed to switch the running mode from the belt running mode to the gear running mode during stop of the vehicle 10, the C2 rotational speed difference ΔNc2 cannot be detected because the input-shaft rotational speed Nin is not increased as a result of engagement of the first clutch C1 after release of the second clutch C2. Thus, when the input-shaft rotational speed Nin is in a low speed range, it is determined that the operation state of the second clutch C2 has been switched to the fully released state upon reduction of the C2 command pressure value to a value that is low enough to ensure the fully released state of the second clutch C2 in the C2 releasing hydraulic control. Further, in addition to the above-described manners for the determination, it may be determined that the operation state of the second clutch C2 has been switched to the fully released state when it is assured that the drive-force transmitting apparatus 16 is placed in the neutral state. For example, in an arrangement with a known manual valve that is provided in the hydraulic control unit 46 to be operated in association with operation of the shift lever 84, an original pressure of the C2 clutch pressure Pc2 supplied to the second clutch C2 becomes not to be supplied to the hydraulic control unit 46 by placement of the shift lever 84 in the neutral position N, whereby the C2 clutch pressure Pc2 supplied to the second clutch C2 is reduced and accordingly the second clutch C2 is released. It is noted that where the C2 releasing hydraulic control is operated by the placement of the shift lever 84 in the neutral position N, the above-described manners with operation of the C2 releasing hydraulic control may be used.

Therefore, the above-described [CONDITION 2] includes first, second and third requirement options. The first requirement option is that (i) the C2 releasing hydraulic control is operated, namely, the hydraulic-control command signal Scbd for executing the C2 releasing hydraulic control is outputted, (ii) the input-shaft rotational speed Nin has been kept not lower than a predetermined speed value Ninf for at least a predetermined length TM1 of time, (iii) the C2 command pressure value in the C2 releasing hydraulic control has been kept not higher than a first predetermined pressure value for at least the predetermined length TM1 of time and (iv) the C2 rotational speed difference $\Delta Nc2$ has been kept higher than a first predetermined difference value $\Delta Nc2f1$ for at least the predetermined length TM1 of time. The second requirement option is that (i) the C2 releasing hydraulic control is operated, (ii) the input-shaft rotational speed Nin has been kept lower than the predetermined speed value Ninf for at least a predetermined length TM2 of time and (iii) the C2 command pressure value in the C2 releasing hydraulic control has been kept not higher than a second predetermined pressure value for at least the predetermined length TM2 of time. The third requirement option is that (iii) it is assured that the drive-force transmitting apparatus 16 is placed in the neutral state, for example, a predetermined length TM3 of time has passed after the shift lever 84 has been placed in the in the neutral position N.

The above-described predetermined speed value Ninf is, for example, a lower limit value of a predetermined range of the input-shaft rotational speed Nin, which enables detection of the C2 rotational speed difference $\Delta Nc2$ that is used in determination of the fully released state of the second clutch C2. Each of the above-described first predetermined pressure value, second predetermined pressure value, first predetermined difference value $\Delta Nc2f1$, predetermined length TM1 of time, predetermined length TM2 of time and predetermined length TM3 of time is, for example, a predetermined threshold value for determining that the second clutch C2 is in the fully released state. The second predetermined pressure value is lower than the first predetermined pressure value, and is, for example, a predetermined upper limit value of a predetermined range of the C2 command pressure value, which ensures that the second clutch C2 is in the fully released state.

When the second clutch C2 had been in the fully engaged state, releasing process state or engaging process state, if any one of the first through third requirement options of the [CONDITION 2] is satisfied, the operation-state determining portion 96 determines that the operation state of the second clutch C2 has been switched to the fully released state, namely, the fully released state is established as the operation state of the second clutch C2, wherein the first requirement option is that the input-shaft rotational speed Nin is not lower than the predetermined speed value Ninf and the rotational speed difference $\Delta Nc2$ of the second clutch C2 is made higher than the first predetermined difference value $\Delta Nc2f1$ by the C2 releasing hydraulic control that is executed to release the second clutch C2 with the C2 command pressure value being not higher than the first predetermined pressure value, the second requirement option is that the input-shaft rotational speed Nin is lower than the predetermined speed value Ninf and the C2 releasing hydraulic control is executed to release the second clutch C2 with the C2 command pressure value being not higher than the second predetermined pressure value, and the third requirement option is that it is assured that the drive-force transmitting apparatus 16 is placed in the neutral state.

When the second clutch C2 had been in the fully released state, releasing process state or engaging process state, if [CONDITION 3] (corresponding to "third condition") as one of the transition-completion conditions is satisfied, it is determined that the operation state of the second clutch C2 has been switched to the fully engaged state, namely, the fully engaged state is established as the operation state of the second clutch C2. As long as, in addition to the fact that the C2 engaging hydraulic control is executed, the C2 rotational speed difference $\Delta Nc2$ has become small with the C2 command pressure value in the C2 engaging hydraulic control being not lower than a pressure value that causes the second clutch C2 to be engaged, there is unlikely to be a problem even if it is determined the operation state of the second clutch C2 has been switched to the fully engaged state. That is, it is determined that the operation state of the second clutch C2 has been switched to the fully engaged state, when the C2 command pressure value that is controlled in the hydraulic control executed for the second clutch C2 is changed in such a way that causes the second clutch C2 to be engaged and it can be regarded that the fully engaged state is actually already established as the operation state of the second clutch C2. Further, in addition to the above-described manner for the determination, it may be determined that the operation state of the second clutch C2 has been switched to the fully engaged state, at a point of time at which the state of the hydraulic control executed for the second clutch C2 is switched from execution of the C2 engaging hydraulic control to execution of a C2 constant hydraulic control that is executed to maintain the fully engaged state of the second clutch C2. For example, where the C2 command pressure value is increased at steps upon switching from the C2 engaging hydraulic control to the C2 constant hydraulic control, if it is still determined that the second clutch C2 is in the engaging process state, at least the thrust-ratio-calculation input torque Tb1 would be calculated to a torque value corresponding to the C2 clutch torque Tcltc2 that is based on the increased C2 command pressure value. Since the thus calculated thrust-ratio-calculation input torque Tb1 could be an inappropriate value, it may be determined that the operation state of the second clutch C2 has been switched to the fully engaged state, at the point of time at which the state of the hydraulic control is switched to execution of the C2 constant hydraulic control.

Therefore, the above-described [CONDITION 3] includes first and second requirement options. The first requirement option is that (i) the C2 engaging hydraulic control is operated, namely, the hydraulic-control command signal Scbd for executing the C2 engaging hydraulic control is outputted, (ii) the C2 command pressure value in the C2 engaging hydraulic control has been kept not lower than a third predetermined pressure value for at least a predetermined length TM4 of time and (iii) the C2 rotational speed difference $\Delta Nc2$ has been kept lower than a second predetermined difference value $\Delta Nc2f2$ for at least the predetermined length TM4 of time. The second requirement option is that the state of the hydraulic control executed for the second clutch C2 has been switched from execution of the C2 engaging hydraulic control to execution of the C2 constant hydraulic control. Each of the above-described third predetermined difference value, second predetermined difference value $\Delta Nc2f2$ and predetermined length TM4 of time is, for example, a predetermined threshold value for determining that the second clutch C2 is in the fully engaged state.

When the second clutch C2 had been in the fully released state, releasing process state or engaging process state, if either one of the first and second requirement options of the [CONDITION 3] is satisfied, the operation-state determining portion 96 determines that the operation state of the second clutch C2 has been switched to the fully engaged state, namely, the fully engaged state is established as the operation state of the second clutch C2, wherein the first requirement option is that the C2 rotational speed difference ΔNc2 is made lower than the second predetermined difference value ΔNc2/2 by the C2 engaging hydraulic control that is executed to engage the second clutch C2 with the C2 command pressure value being not lower than the third predetermined pressure value, and the second requirement option is that the state of the hydraulic control executed for the second clutch C2 has been switched from execution of the C2 engaging hydraulic control to the C2 constant hydraulic control.

When the second clutch C2 had been in the fully engaged state, if [CONDITION 4] (corresponding to "fourth condition") as one of the transition-completion conditions is satisfied, it is determined that the operation state of the second clutch C2 has been switched to the releasing process state, namely, the releasing process state is established as the operation state of the second clutch C2. As long as the C2 rotational speed difference ΔNc2 is increased in addition to the fact that the C2 releasing hydraulic control is executed, there is unlikely to be a problem even if it is determined the operation state of the second clutch C2 has been switched to the releasing process state. For example, when there is a failure of an electromagnetic valve or other device provided to regulate the C2 clutch pressure Pc2 supplied to the second clutch C2, even if the C2 releasing hydraulic control is executed, the actual operation state of the second clutch C2 could be the fully engaged state. In such a case, the belt-slippage-prevention input torque Tb2 could be calculated to a torque value lower than the torque actually inputted to the continuously-variable transmission mechanism 24, so that there is a risk that a belt slippage could occur in the continuously-variable transmission mechanism 24. Thus, for avoiding occurrence of the belt slippage, it is not determined that the operation state of the second clutch C2 has been switched to the releasing process state, only by the fact that the C2 releasing hydraulic control is executed. The determination is made also by taking account of whether the C2 rotational speed difference ΔNc2 is increased or not.

Therefore, the above-described [CONDITION 4] is that (i) the C2 releasing hydraulic control is operated and (ii) the C2 rotational speed difference ΔNc2 has been kept not lower than the third predetermined difference value ΔNc2/3 for at least a predetermined length TM5 of time. Each of the above-described third predetermined difference value ΔNc2/3 and predetermined length TM5 of time is, for example, a predetermined threshold value for determining that the second clutch C2 is in the releasing process state.

When the second clutch C2 had been in the fully engaged state, if the [CONDITION 4] is satisfied, the operation-state determining portion 96 determines that the operation state of the second clutch C2 has been switched to the releasing process state, namely, the releasing process state is established as the operation state of the second clutch C2, wherein the [CONDITION 4] is that the C2 rotational speed difference ΔNc2 is made not lower than a predetermined difference value in the form of the third predetermined difference value ΔNc2/3 by the C2 releasing hydraulic control that is executed to release the second clutch C2.

When the second clutch C2 had been in the engaging process state, if [CONDITION 5] (corresponding to "fifth condition") as one of the transition-completion conditions is satisfied, it is determined that the operation state of the second clutch C2 has been switched to the releasing process state, namely, the releasing process state is established as the operation state of the second clutch C2. As long as the operation state of the second clutch C2 is switched from execution of the C2 engaging hydraulic control to execution of the C2 releasing hydraulic control, there is unlikely to be a problem even if it is determined the operation state of the second clutch C2 has been switched to the releasing process state. When the second clutch C2 is in the engaging process state, there is a certain amount of the C2 rotational speed difference ΔNc2. Further, when it is determined that the second clutch C2 is in placed in the engaging process state, the thrust-ratio-calculation input torque Tb1 is set to a torque value corresponding to the C2 clutch torque Tcltc2 that is calculated based on the C2 command pressure value. Therefore, only with the fact that the C2 releasing hydraulic control is executed, it is determined that the operation state of the second clutch C2 has been switched to the releasing process state.

Therefore, the above-described [CONDITION 5] is that the C2 releasing hydraulic control is executed. When the second clutch C2 had been in the engaging process state, if the [CONDITION 5] is satisfied, the operation-state determining portion 96 determines that the operation state of the second clutch C2 has been switched to the releasing process state, namely, the releasing process state is established as the operation state of the second clutch C2, wherein the [CONDITION 5] is that the C2 releasing hydraulic control is executed to release the second clutch C2.

The transmission shifting control portion 94 calculates the input torque inputted to the continuously-variable transmission mechanism 24, depending on the operation state of the second clutch C2 that has been determined by the operation-state determining portion 96. The transmission shifting control portion 94 calculates the primary target thrust Wintgt and the secondary target thrust Wouttg, based on the input torque inputted to the continuously-variable transmission mechanism 24.

In the vehicle 10, the hydraulic control unit 46 includes the accumulator 88 that is provided in a position to which an original pressure of the C2 solenoid valve SL2, i.e., the drive pressure PD, is supplied. Thus, during execution of the C2 releasing hydraulic control by which the second clutch C2 is placed in the releasing process state, the controllability of the C2 clutch pressure Pc2 is affected by the storage state of the drive pressure PD in the accumulator 88. In the following descriptions relating to the present embodiment, the storage state of the drive pressure PD in the accumulator 88 will be simply referred to as "hydraulic-pressure storage state". For example, when a garage operation has been executed by operation of the shift lever 84 from the drive position D to the neutral position N, the drive pressure PD is not supplied to the drive-pressure passage 89. In this instance, if the hydraulic-pressure storage state of the accumulator 88 is a completely filled state, the hydraulic pressure in the drive-pressure passage 89 is gently lowered so that the controllability of the C2 clutch pressure Pc2 in the C2 releasing hydraulic control is made higher than a case in which the hydraulic-pressure storage state of the accumulator 88 is not the completely filled state.

The transmission shifting control portion 94 calculates, based on the hydraulic-pressure storage state of the accumulator 88, the input torque inputted to the continuously-variable transmission mechanism 24 when the second clutch C2 is in the releasing process state.

For accurately calculating the input torque inputted to the continuously-variable transmission mechanism 24 as a torque value corresponding to the C2 clutch torque Tcltc2, it is necessary to accurately determine the hydraulic-pressure storage state of the accumulator 88. Since the vehicle 10 is not equipped with a hydraulic sensor or the like for detecting the hydraulic-pressure storage state of the accumulator 88, the hydraulic-pressure storage state cannot be directly determined. In the present embodiment, the hydraulic-pressure storage state of the accumulator 88 is categorized into two states consisting of (i) the completely filled state (i.e., a state in which it is certain that the hydraulic-pressure storage state of the accumulator 88 is the completely filled state) and (ii) an uncertain state in which it is uncertain whether the hydraulic-pressure storage state of the accumulator 88 is the completely filled state or not.

When the C2 releasing hydraulic control is executed with the second clutch C2 having been in the fully engaged state, it can be certained that filling of the accumulator 88 with the hydraulic pressure has been completed. Therefore, when the operation state of the second clutch C2 has been switched to the releasing process state from the fully engaged state, the transmission shifting control portion 94 determines that the hydraulic-pressure storage state of the accumulator 88 is the completely engaged state. The case in which the operation state of the second clutch C2 has been switched to the releasing process state from the fully engaged state is a case in which it is determined by the operation-state determining portion 96 that the operation state of the second clutch C2 has been switched to the releasing process state, with satisfaction of the above-described [CONDITION 4] when the second clutch C2 had been in the fully engaged state. In this case, it is regarded that the controllability of the C2 clutch pressure Pc2 in the C2 releasing hydraulic control is assured. The C2 releasing hydraulic control constitutes the clutch to clutch shifting operation or garage releasing control, which is executed for releasing the second clutch C2 and engaging the first clutch C1, as described above.

On the other hand, when the C2 releasing hydraulic control is executed with the second clutch C2 having been in the engaging process state, it is uncertain whether filling of the accumulator 88 with the hydraulic pressure has been completed or not. Therefore, when the operation state of the second clutch C2 has been switched to the releasing process state from the engaging process state, the transmission shifting control portion 94 determines that the hydraulic-pressure storage state of the accumulator 88 is an uncertain state (in which it is uncertain whether the hydraulic-pressure storage state of the accumulator 88 is the completely filled state or not). The case in which the operation state of the second clutch C2 has been switched to the releasing process state from the engaging process engaged state is a case in which it is determined by the operation-state determining portion 96 that the operation state of the second clutch C2 has been switched to the releasing process state, with satisfaction of the above-described [CONDITION 5] when the second clutch C2 had been in the engaging process state.

Thus, when the operation state of the second clutch C2 has been switched to the releasing process state from the fully engaged state, it can be regraded that the filling of the hydraulic pressure in the accumulator 88 has been completed, so that the input torque inputted to the continuously-variable transmission mechanism 24 is calculated with an assumption that the C2 clutch torque Tcltc2 can be controlled to a torque value corresponding to the C2 command pressure value in the C2 releasing hydraulic control.

Figure 11:
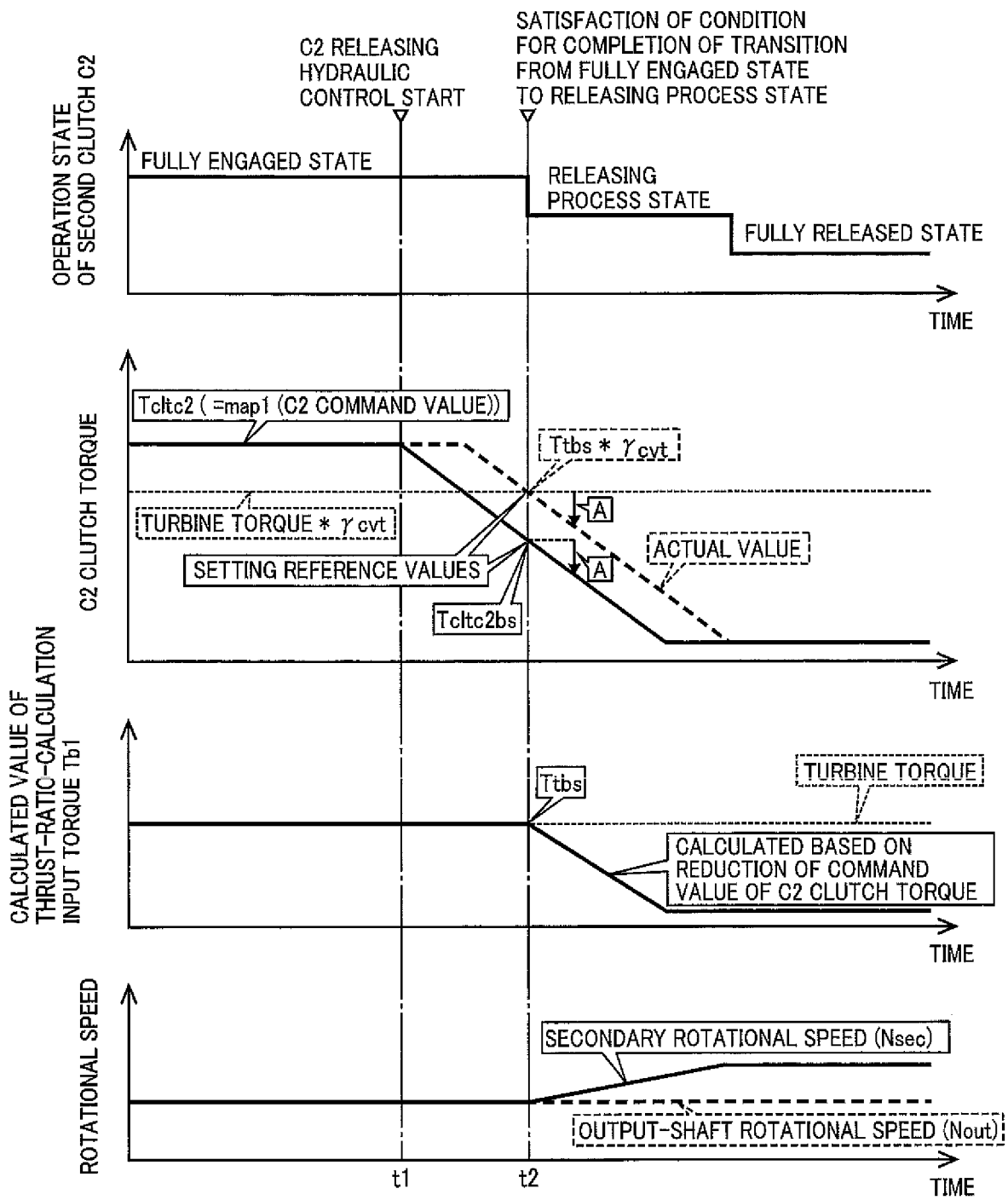
FIG. 11 is a view for explaining a method of calculating a thrust-ratio-calculation input torque in a case in which the operation state of the second clutch has been switched to the releasing process state from the fully engaged state.

FIG. 11 is a view for explaining a method of calculating the thrust-ratio-calculation input torque Tb1 in a case in which the operation state of the second clutch C2 has been switched to the releasing process state from the fully engaged state. The thrust-ratio-calculation input torque Tb1 is an input torque value that is to be obtained for the purpose of assuring a high followability of the actual gear ratio γ with respect to the target gear ratio γcvttgt in the continuously-variable transmission mechanism 24. Thus, the thrust-ratio-calculation input torque Tb1 is required to be calculated to a torque value corresponding to a net value of the input torque inputted to the continuously-variable transmission mechanism 24. In FIG. 11, a point t1 of time indicates a point of time at which execution of the C2 releasing hydraulic control starts when the second clutch C2 is in the fully engaged state, and a point t2 of time indicates a point of time at which the above-described [CONDITION 4] is satisfied upon increase of the C2 rotational speed difference ΔNc2 to a certain value whereby it is determined the operation state of the second clutch C2 has been switched to the releasing process state. In FIG. 11, "Ttbs" represents a value of the turbine torque Tt at the point t2 of time at which the operation state of the second clutch C2 is switched from the fully engaged state to the releasing process state, and will be referred to as "reference turbine torque value". Further, "Tcltc2*bs*" represents a value of the C2 clutch torque Tcltc2 at the point t2 of time, and will be referred to as "reference C2 clutch torque value". While the operation state of the second clutch C2 is the releasing process state, the transmission shifting control portion 94 keeps, as the reference turbine torque value Ttbs and reference C2 clutch torque value Tcltc2*bs*, the values of the respective turbine torque Tt and C2 clutch torque Tcltc2 at the point t2 of time. The transmission shifting control portion 94 calculates the C2 clutch torque Tcltc2 (=map1 (C2 command pressure value)), by applying the C2 command pressure value, for example, to a predetermined relationship in the form of a C2 clutch torque map map1. Thus, the calculated C2 clutch torque Tcltc2 corresponds also to a command value of the C2 clutch torque, i.e., "torque-capacity command value" recited in the appended claims. "Ttbs*γcvt" is a value of the turbine torque Tt that is transmitted to the second clutch C2 when the actual gear ratio γcvt of the continuously-variable transmission mechanism 24 is a ratio value represented by "γcvt", namely, a converted value of the turbine torque Tt converted on the secondary shaft 62 that corresponds to "the second-engagement-device rotary member" recited in the appended claims when the actual gear ratio γcvt of the continuously-variable transmission mechanism 24 is the ratio value represented by "γcvt", and will be referred to as "secondary transmitted torque value". It is noted that the turbine torque Tt is a converted value of the engine torque Te (as the output torque of the engine 12), which is converted on the input shaft 22.

When the actual value of the C2 clutch torque Tcltc2, which is represented by broken line in FIG. 11, becomes smaller than the secondary transmitted torque value (=turbine torque*γcvt), the operation state of the second clutch C2 is actually switched to the releasing process state. Therefore, the thrust-ratio-calculation input torque Tb1 is calculated based on the secondary transmitted torque value (=Ttbs*actual γcvt) and the reference C2 clutch torque value Tcltc2*bs* at the point t2 of time. Specifically, since the actual value of the C2 clutch torque Tcltc2 coincides with a converted value (Tt*actual γcvt) of the turbine torque Tt (corresponding to a converted value of the engine torque Te) converted on the secondary shaft 62 as the second-engagement-device rotary member, at the above-described point t2 of time, the actual value of the C2 clutch torque Tcltc2 at the point t2 of time is obtained such that the obtained actual value of the C2 clutch torque Tcltc2 is equal to the converted value (Ttbs*actual γcvt) of the turbine torque Tt at the point t2 of time. Then, the actual value of the C2 clutch torque Tcltc2 during the releasing process state is updated to a torque value (Tcltc2rel=Ttbs*actual γcvt−(Tcltc2bs−Tcltc2)) that is obtained by subtracting, from the obtained actual value (=Ttbs*actual γcvt) of the C2 clutch torque Tcltc2, a torque capacity reduction value (Tcltc2bs−Tcltc2) that is a reduction A of a torque-capacity command value (C2 command pressure value) of the second clutch C2 from the point t2 of time. That is, the actual value of the C2 clutch torque Tcltc2 is reduced from the secondary transmitted torque value (=Ttbs*actual γcvt) at the point t2 of point by an amount corresponding to the reduction A (=Tcltc2bs−Tcltc2) by which the C2 clutch torque Tcltc2 is reduced from the reference C2 clutch torque value Tcltc2bs by reduction of the C2 command pressure value. The reduction A corresponds to an amount of reduction of the C2 clutch torque Tcltc2 from the point t2 of time at which the operation state of the second clutch C2 is switched to the releasing process state from the fully engaged state. That is, the actual value of the C2 clutch torque Tcltc2 is calculated in accordance with equation (6) given below, where "Tcltc2rel" represents the actual value of the C2 clutch torque Tcltc2. Basically, the thrust-ratio-calculation input torque Tb1 is set to a converted value (=Tcltc2rel/actual γcvt) of the actual value Tcltc2rel of the C2 clutch torque Tcltc2, which is converted on the input shaft 22. That is, the thrust-ratio-calculation input torque Tb1 is set to the turbine torque Tt when the second clutch C2 is in the fully engaged state, and is basically set to a value (Tcltc2rel/actual γcvt) obtained by subtracting a converted value (=(Tcltc2bs−Tcltc2)/actual γcvt) of the reduction A (=Tcltc2bs−Tcltc2) converted on the input shaft 22, from the reference turbine torque value Ttbs. The thrust-ratio-calculation input torque Tb1 is thus calculated by taking account of change of the C2 actual pressure value with delay in response to change of the C2 command pressure value. Further, when the second clutch C2 is in the releasing process state, the turbine torque Tt is larger than a converted value of the actual value Tcltc2rel of the C2 clutch torque Tcltc2 converted on the input shaft 22, namely, a relationship represented by "Tt>Tcltc2rel/actual γcvt" is satisfied. Therefore, normally, the converted value (Tcltc2rel/actual γcvt) of the actual value Tcltc2rel, which corresponds to a smaller one of the turbine torque Tt and the converted value of the actual value Tcltc2rel of the C2 clutch torque Tcltc2 converted on the input shaft 22, is selected as the thrust-ratio-calculation input torque Tb1, in accordance with equation (7) given below.

$$Tcltc2rel = Ttbs \cdot \text{actual } \gamma cvt - (Tcltc2bs - Tcltc2) \tag{6}$$

$$Tb1 = \min(Tt, Tcltc2rel/\text{actual } \gamma cvt) \tag{7}$$

Thus, when the operation state of the second clutch C2 has been switched to the releasing process state from the fully engaged state, the transmission shifting control portion 94 selects, as the thrust-ratio-calculation input torque Tb1 in the releasing process state of the second clutch C2, a smaller one of first and second option values, wherein the first option value is the turbine torque Tt, and the second option value is the value (Tcltc2rel/actual γcvt) that is obtained by subtracting the converted value (=(Tcltc2bs−Tcltc2)/actual γcvt) of the reduction A (=Tcltc2bs−Tcltc2) converted on the input shaft 22, from the reference turbine torque value Ttbs.

There will be next described a method of calculating the belt-slippage-prevention input torque Tb2 in the case in which the operation state of the second clutch C2 has been switched to the releasing process state from the fully engaged state. The belt-slippage-prevention input torque Tb2 has to be a minimally required input torque for improving a fuel economy and preventing a belt slippage. Particularly, where the belt-slippage-prevention input torque Tb2 is set to a value dependent on the C2 clutch torque Tcltc2, the belt slippage has to be prevented even if there is a response delay of the C2 actual pressure value. Thus, as the belt-slippage-prevention input torque Tb2, the largest one of three option values consisting of third through five option values is selected, wherein the third option value is the thrust-ratio-calculation input torque Tb1 (calculated as described above), the fourth value is the turbine torque Tt, and the fifth value is a converted value of a dragging torque of the second clutch C2 converted on the input shaft 22, as indicated in equation (8) given below. The dragging torque of the second clutch C2 is, for example, a predetermined torque value in a state in which the second clutch C2 is in the fully released state. The thrust-ratio-calculation input torque Tb1 is a torque value taking account of change of the C2 actual pressure value with delay in response to change of the C2 command pressure value. Further, as indicated in the equation (8), the turbine torque Tt is added as one of the three option values, in view of a possibility that the second clutch C2 could be engaged irrespective of execution of the C2 releasing hydraulic control, in the event of a failure or a fail-safe actuation.

$$Tb2 = \max(Tb1, Tt, C2 \text{ dragging torque(value converted on input shaft 22))} \tag{8}$$

Thus, when the operation state of the second clutch C2 has been switched to the releasing process state from the fully engaged state, the transmission shifting control portion 94 selects, as the belt-slippage-prevention input torque Tb2 for the releasing process state of the second clutch C2, the largest one of (i) the thrust-ratio-calculation input torque Tb1 (calculated as described above), (ii) the turbine torque Tt and (iii) the converted value of the dragging torque of the second clutch C2 converted on the input shaft 22.

When the operation state of the second clutch C2 has been switched to the releasing process state from the engaging process sate, the hydraulic-pressure storage state of the accumulator 88 is the uncertain state and there is a certain amount of the C2 rotational speed difference ΔNc2. Therefore, the C2 clutch torque Tcltc2 in the C2 releasing hydraulic control cannot be calculated so accurately as when the operation state of the second clutch C2 has been switched to the releasing process state from the fully engaged state. When the operation state of the second clutch C2 has been switched to the releasing process state from the engaging process sate, the input torque inputted to the continuously-variable transmission mechanism 24 is set to a converted value of the C2 clutch torque Tcltc2 corresponding to the C2 command pressure value, which is converted on the input shaft 22, as in a state in which the second clutch C2 is in the engaging process state, in view of smooth change of the input torque inputted to the continuously-variable transmission mechanism 24 upon transition from the engaging process state to the releasing process state. The smooth change of the input torque means a change of the input torque without steps upon the transition from the engaging process state to the releasing process state.

There will be next described a method of calculating the thrust-ratio-calculation input torque Tb1 in a case in which the operation state of the second clutch C2 has been switched to the releasing process state from the engaging process state. In this case, the thrust-ratio-calculation input torque Tb1 is calculated based on the C2 command pressure value. That is, the actual value Tcltc2rel of the C2 clutch torque Tcltc2 is set to the C2 clutch torque Tcltc2 (=map1

(C2 command pressure value)) as indicated in equation (9) given below. Basically, the thrust-ratio-calculation input torque Tb1 is set to a converted value (=Tcltc2rel/actual γcvt) of the actual value Tcltc2rel of the C2 clutch torque Tcltc2 converted on the input shaft 22. Further, as described above, when the second clutch C2 is in the releasing process state, the relationship represented by "Tt>Tcltc2rel/actual γcvt" is satisfied. Therefore, normally, the converted value (Tcltc2rel/actual γcvt) of the actual value Tcltc2rel, which corresponds to a smaller one of the turbine torque Tt and the converted value of the actual value Tcltc2rel of the C2 clutch torque Tcltc2 converted on the input shaft 22, is selected as the thrust-ratio-calculation input torque Tb1, in accordance with equation (10) given below.

$$Tcltc2rel = Tcltc2 \qquad (9)$$

$$Tb1 = \min(Tt, Tcltc2rel/\text{actual } \gamma cvt) \qquad (10)$$

Thus, when the operation state of the second clutch C2 has been switched to the releasing process state from the engaging process state, the transmission shifting control portion 94 selects, as the thrust-ratio-calculation input torque Tb1 in the releasing process state of the second clutch C2 (to which the operation state of the second clutch C2 has been switched from the engaging process state), a smaller one of a sixth option value and a seventh option value, wherein the sixth option value is the turbine torque Tt, and the seventh option value is the converted value (=Tcltc2/actual γcvt) of the C2 clutch torque Tcltc2 (=map1 (C2 command pressure value)).

There will be next described a method of calculating the belt-slippage-prevention input torque Tb2 in the case in which the operation state of the second clutch C2 has been switched to the releasing process state from the engaging process state. Basically, this method of calculation of the belt-slippage-prevention input torque Tb2 is substantially the same as that in the case in which the operation state of the second clutch C2 has been switched to the releasing process state from the fully engaged state. That is, as the belt-slippage-prevention input torque Tb2 in the releasing process state of the second clutch C2 (to which the operation state of the second clutch C2 has been switched from the engaging process state), the largest one of three option values consisting of an eighth option value, a ninth option value and a tenth option value is selected, wherein the eighth option value is the thrust-ratio-calculation input torque Tb1 (calculated as described above in the case in which the operation state of the second clutch C2 has been switched to the releasing process state from the engaging process state), the ninth option value is the turbine torque Tt, and the tenth option value is the converted value of the dragging torque of the second clutch C2 converted on the input shaft 22, as indicated in equation (11) given below. It should be noted that, unlike when the operation state of the second clutch C2 has been changed to the releasing process state from the fully engaged state, when the operation state has been changed to the releasing process sate from the engaging process state, the thrust-ratio-calculation input torque Tb1 is a torque value not taking account of delay of change of the C2 actual pressure value relative to change of the C2 command pressure value. Therefore, as indicated in the equation (11), the turbine torque Tt is added as one of the three option values, in view of the possible delay of change of the C2 actual pressure value relative to change of the C2 command pressure value.

$$Tb2 = \max(Tb1, Tt, C2 \text{ dragging torque(value converted on input shaft 22))} \qquad (11)$$

Thus, when the operation state of the second clutch C2 has been switched to the releasing process state from the engaging process state, the transmission shifting control portion 94 selects, as the belt-slippage-prevention input torque Tb2 in the releasing process state of the second clutch C2, the largest one of (i) the thrust-ratio-calculation input torque Tb1 (calculated as described above), (ii) the turbine torque Tt and (iii) the converted value of the dragging torque of the second clutch C2 converted on the input shaft 22.

Figure 12:
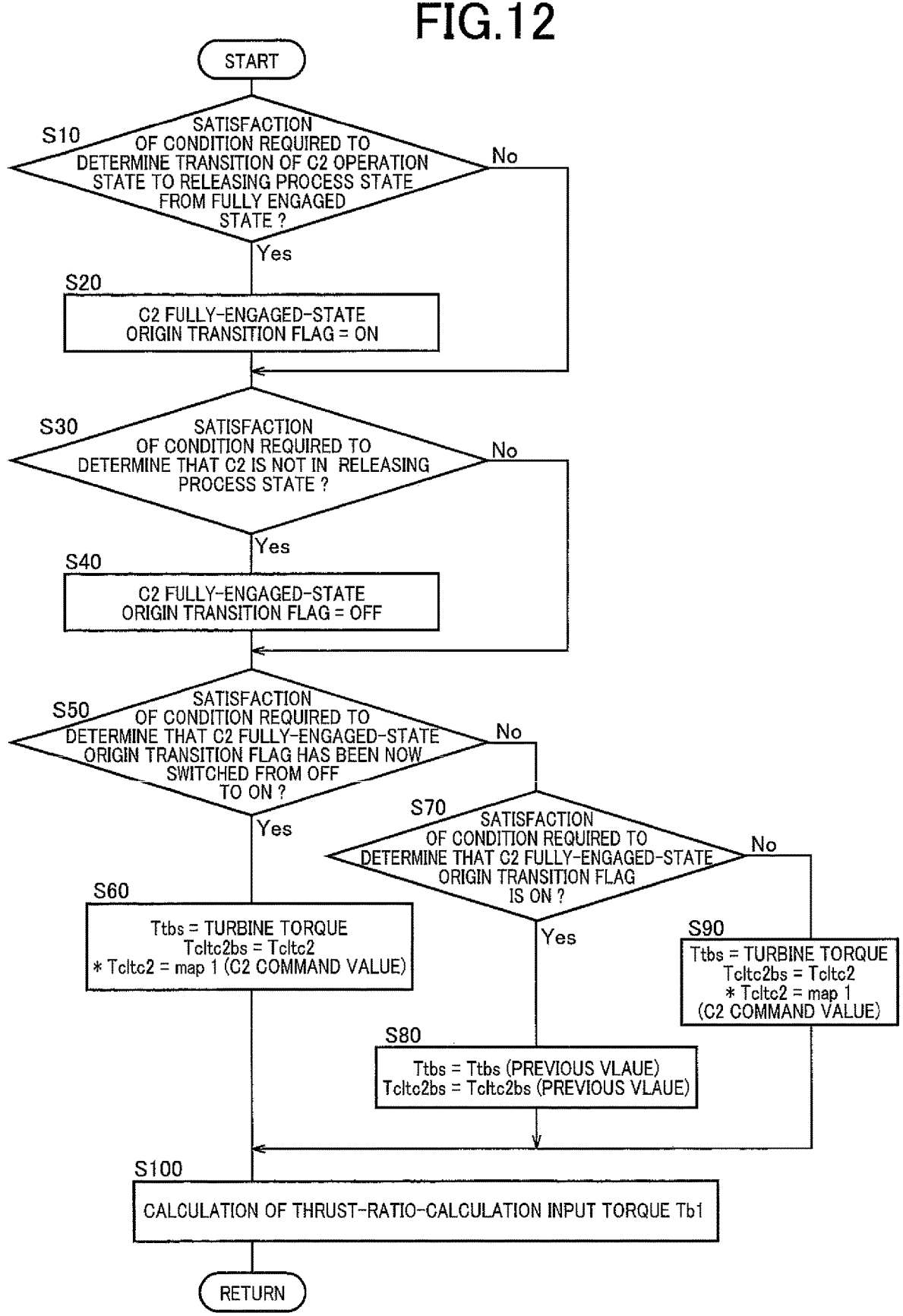
FIG. 12 is a flow chart showing a main part of a control routine executed by the control apparatus, namely, a control routine that is executed for setting a reference turbine torque value and a reference C2 clutch torque value in a case in which the operation state of the second clutch is switched to the releasing process state from the fully engaged state.

FIG. 12 is a flow chart showing a main part of a control routine executed by the electronic control apparatus 90, namely, a control routine that is executed for setting the reference turbine torque value Ttbs and the reference C2 clutch torque value Tcltc2bs in the case in which the operation state of the second clutch C2 is switched to the releasing process state from the fully engaged state. This control routine is executed, for example, in a repeated manner.

As shown in FIG. 12, the control routine is initiated with step S10 corresponding to function of the operation-state determining portion 96, which is implemented to determine whether the above-described [CONDITION 4] as one of the transition-completion conditions is satisfied or not, namely, whether the condition, which is required to determine that the transition of the operation state of the second clutch C2 to the releasing process state from the fully engaged state has been completed, is satisfied or not. When an affirmative determination is made at step S10, step S20 corresponding to function of the operation-state determining portion 96 is implemented whereby a C2 fully-engaged-state origin transition flag is set to ON. When a negative determination is made at step S10 or after implementation of step S20, the control flow goes to step S30 corresponding to function of the operation-state determining portion 96, which is implemented to determine whether a condition, which is required to determine that the second clutch C2 is not in the releasing process state, is satisfied or not. When an affirmative determination is made at step S30, step S40 corresponding to function of the operation-state determining portion 96 is implemented to set the C2 fully-engaged-state origin transition flag to OFF. When a negative determination is made at step S30 or after implementation of step S40, the control flow goes to step S50 corresponding to function of the operation-state determining portion 96, which is implemented to determine whether a condition, which is required to determine that the C2 fully-engaged-state origin transition flag has been switched from OFF to ON at this time of execution of the control routine, is satisfied or not. When an affirmative determination is made at step S50, step S60 corresponding to function of the transmission shifting control portion 94 is implemented to set the reference turbine torque value Ttbs to a value of the turbine torque Tt at a point of time of the transition, and to set the reference C2 clutch torque value Tcltc2bs to a value of the C2 clutch torque Tcltc2 (=map1 (C2 command pressure value)) at the point of time of the transition. When a negative determination is made at step S50, the control flow goes to step S70 corresponding to function of the operation-state determining portion 96, which is implemented to determine whether a condition that whether a condition, which is required to determine that the C2 fully-engaged-state origin transition flag is ON, is satisfied or not. When an affirmative determination is made at step S70, step S80 corresponding to function of the transmission shifting control portion 94 is implemented to set the reference turbine torque value Ttbs to a previous value of the reference turbine torque value Ttbs, and to set the reference C2 clutch torque value Tcltc2bs to a previous value of the reference C2 clutch torque value Tcltc2bs. That is, as long as the second clutch C2 is in the releasing process state, the values of the respective turbine torque Tt and C2 clutch torque Tcltc2 at the point of time of the transition are kept as the reference turbine torque value Ttbs and reference C2 clutch torque value Tcltc2bs. When a negative determination is made at step S70, the control flow goes to step S90 corresponding to function of the transmission shifting control portion 94, which is implemented to set the reference turbine torque value Ttbs to a current value of the turbine torque Tt at a current point of time, and to set the reference C2 clutch torque value Tcltc2bs to a current value of the C2 clutch torque Tcltc2 (=map1 (C2 command pressure value)) at the current point of time. Each of steps S60, S80 and S90 is followed by step S100 corresponding to function of the transmission shifting control portion 94, which is implemented to calculate the thrust-ratio-calculation input torque Tb1 by applying the reference turbine torque value Ttbs and the reference C2 clutch torque value Tcltc2bs to the above-described equations (6) and (7). It is noted that the case in which the negative determination is made at step S70 corresponds to a state before it is determined that the operation state of the second clutch C2 has been switched to the releasing process state from the fully engaged state. In that case, the reference turbine torque value Ttbs and the reference C2 clutch torque value Tcltc2bs, which are set to the above-described values at step S90, are applied to the above-described equations (6) and (7), so that the thrust-ratio-calculation input torque Tb1 is set to the turbine torque Tt.

Figure 13:
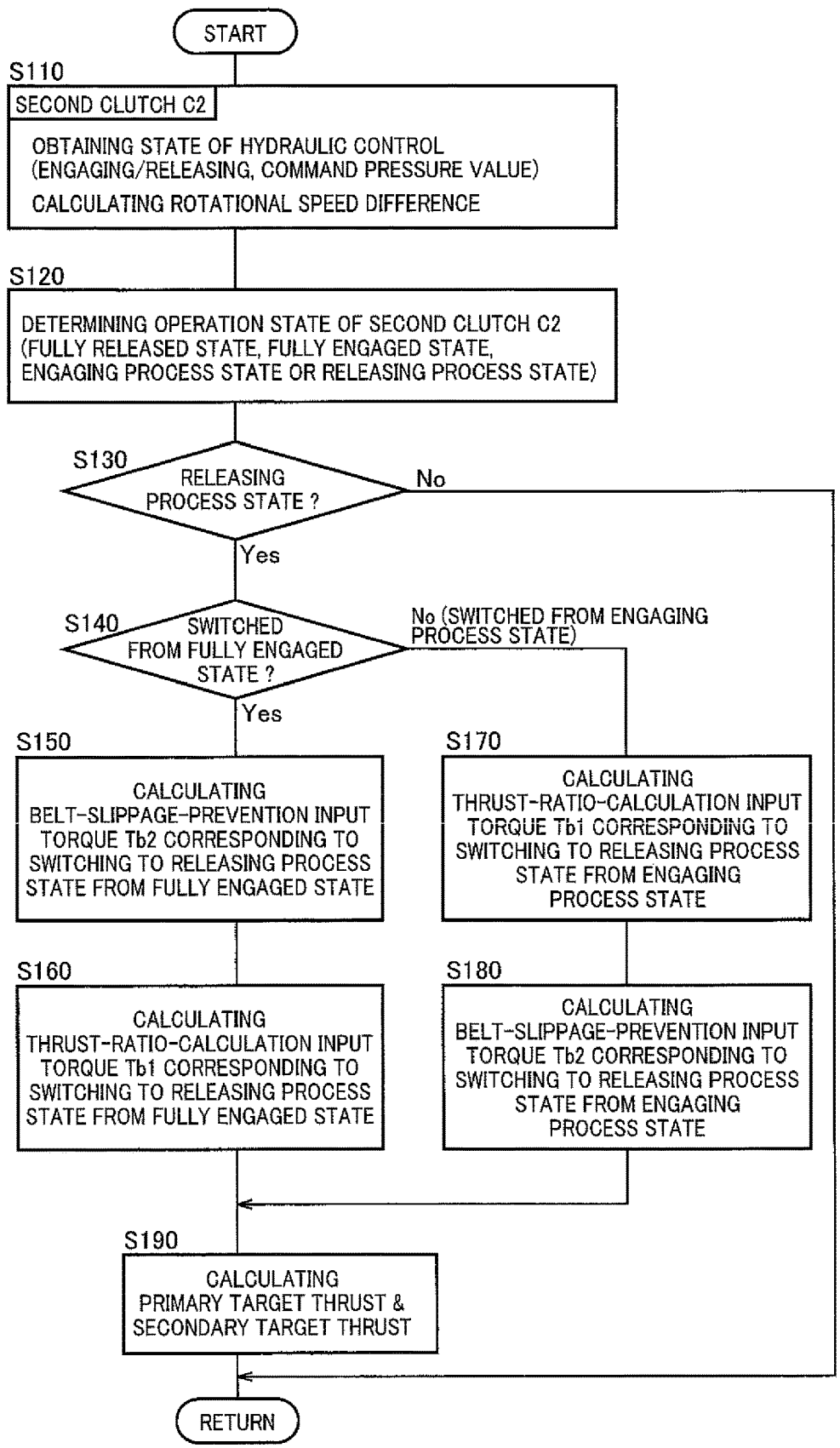
FIG. 13 is a flow chart showing a main part of a control routine executed by the control apparatus, namely, a control routine that is executed for improving accuracy of calculation of the input torque inputted to the continuously-variable transmission mechanism when the second clutch is in the releasing process state.

FIG. 13 is a flow chart showing a main part of a control routine executed by the electronic control apparatus 90, namely, a control routine that is executed for improving accuracy of calculation of the input torque inputted to the continuously-variable transmission mechanism 24 when the second clutch C2 is in the releasing process state. This control routine is executed, for example, in a repeated manner.

As shown in FIG. 13, the control routine is initiated with step S110 corresponding to function of the operation-state determining portion 96, which is implemented to obtain a state of the hydraulic control and calculate the C2 rotational speed difference ΔNc2. Step S110 is followed by step S120 corresponding to function of the operation-state determining portion 96, which is implemented to determine the operation state of the second clutch C2, namely, determine which one of the above-described four states (i.e., fully released state, fully engaged state, releasing process state, engaging process state) is being established as the operation state of the second clutch C2 is established as the operation state of the second clutch C2, through the control operation described with reference to FIG. 10. Then, step S130 corresponding to function of the operation-state determining portion 96 is implemented to determine whether the operation state of the second clutch C2 is the releasing process state or not. When a negative determination is made at step S130, one cycle of execution of the control routine is completed. When an affirmative determination is made at step S130, step S140 corresponding to function of the operation-state determining portion 96 is implemented to determine whether the operation state of the second clutch C2 has been switched to the releasing process state from the fully engaged state or not, namely, whether the transition of the operation state of the second clutch C2 to the releasing process state was made from the fully engaged state or not. When an affirmative determination is made at step S140, step S150 corresponding to function of the transmission shifting control portion 94 is implemented to calculate the thrust-ratio-calculation input torque Tb1 in the releasing process state such that the thrust-ratio-calculation input torque Tb1 is calculated to a value suitable for the case of the transition from the fully engaged state in accordance with the above-described equations (6), (7). Step S150 is followed by step S160 corresponding to function of the transmission shifting control portion 94, which is implemented to calculate the belt-slippage-prevention input torque Tb2 in the releasing process state such that the belt-slippage-prevention input torque Tb2 is calculated to a value suitable for the case of the transition from the fully engaged state in accordance with the above-described equation (8). When a negative determination is made at step S140, the control flow goes to step S170 corresponding to function of the transmission shifting control portion 94, which is implemented to calculate the thrust-ratio-calculation input torque Tb1 in the releasing process state such that the thrust-ratio-calculation input torque Tb1 is calculated to a value suitable for the case of the transition from the engaging process state in accordance with the above-described equations (9), (10). Step S170 is followed by step S180 corresponding to function of the transmission shifting control portion 94, which is implemented to calculate the belt-slippage-prevention input torque Tb2 in the releasing process state such that the belt-slippage-prevention input torque Tb2 is calculated to a value suitable for the case of the transition from the engaging process state in accordance with the above-described equation (11). Each of steps S160 and S180 is followed by step S190 corresponding to function of the transmission shifting control portion 94, which is implemented to calculate the primary target thrust Wintgt and the secondary target thrust Wouttgt through the control operation described with reference to FIG. 5, by using the thrust-ratio-calculation input torque Tb1 and the belt-slippage-prevention input torque Tb2 that are calculated described above.

In the present embodiment, the input torque inputted to the continuously-variable transmission mechanism 24 during the releasing process state of the second clutch C2 is calculated based on the hydraulic-pressure storage state in the accumulator 88. Thus, the input torque inputted to the continuously-variable transmission mechanism 24 can be calculated more accurately than where it is calculated without the hydraulic-pressure storage state in the accumulator 88 being taken into account. Therefore, it is possible to improve an accuracy of calculation of the input torque inputted to the continuously-variable transmission mechanism 24 during the releasing process state of the second clutch C2.

In the present embodiment, the primary target thrust Wintgt and the secondary target thrust Wouttgt are calculated based on the accurately calculated input torque inputted to the continuously-variable transmission mechanism 24 during the releasing process state of the second clutch C2. That is, the continuously-variable transmission mechanism 24 can be appropriately controlled by using the accurately calculated input torque inputted to the continuously-variable transmission mechanism 24 during the releasing process state of the second clutch C2.

In the present embodiment, the thrust-ratio-calculation input torque Tb1 that is used in calculation of the thrust ratio τ for establishing the target gear ratio γcvttgt of the continuously-variable transmission mechanism 24 and the belt-slippage-prevention input torque Tb2 that is used in calculation of the primary and secondary thrusts Win, Wout required to prevent a belt slippage in the continuously-variable transmission mechanism 24 are calculated as the input torque inputted to the continuously-variable transmission mechanism 24. Thus, the continuously-variable transmission mechanism 24 can be appropriately controlled.

In the present embodiment, even without a hydraulic sensor or the like configured to detect the hydraulic-pressure storage state in the accumulator 88, it is possible to determine that the hydraulic-pressure storage state in the accumulator 88 is the completely filled state when the operation state of the second clutch C2 has been switched to the releasing process state from the fully engaged state. Further, when the operation state of the second clutch C2 has been switched to the releasing process state from the fully engaged state, it is possible to appropriately calculate the thrust-ratio-calculation input torque Tb1 during the releasing process state of the second clutch C2.

In the present embodiment, when the operation state of the second clutch C2 has been switched to the releasing process state from the engaging process state, it is possible to appropriately calculate the belt-slippage-prevention input torque Tb2 during the releasing process state of the second clutch C2.

In the present embodiment, even without a hydraulic sensor or the like configured to detect the hydraulic-pressure storage state in the accumulator 88, it is possible to determine that the hydraulic-pressure storage state in the accumulator 88 is the uncertain state when the operation state of the second clutch C2 has been switched to the releasing process state from the engaging process state. Further, it is possible to appropriately calculate the thrust-ratio-calculation input torque Tb1 during the releasing process state of the second clutch C2, when the operation state of the second clutch C2 has been switched to the releasing process state from the engaging process state.

In the present embodiment, when the operation state of the second clutch C2 has been switched to the releasing process state from the engaging process state, it is possible to appropriately calculate the belt-slippage-prevention input torque Tb2 during the releasing process state of the second clutch C2.

In the present embodiment, it is determined that the operation state of the second clutch C2 has been switched to the releasing process state, if the above-described [CONDITION 4] is satisfied when the second clutch C2 had been in the fully engaged state, so that it can be appropriately determined that the operation state of the second clutch C2 has been switched to the releasing process state. Further, it is determined that the operation state of the second clutch C2 has been switched to the releasing process state, if the above-described [CONDITION 5] is satisfied when the second clutch C2 had been in the engaging process state, so that it can be appropriately determined that the operation state of the second clutch C2 has been switched to the releasing process state.

While the preferred embodiment of this invention has been described in detail by reference to the drawings, it is to be understood that the invention may be otherwise embodied.

The control routine shown in the flow chart of FIG. 13 may be modified as needed. For example, steps S120-S140 may be integrated into a single step so that the determinations made in steps S120-S140 are made in the single step.

In the above-described embodiment, the continuously-variable transmission mechanism 24 is a belt-type continuously-variable transmission. However, the continuously-variable transmission mechanism provided in the second drive-force transmitting path PT2 may be a known toroidal-type continuously variable transmission, for example.

In the above-described embodiment, the second clutch C2 is disposed in a drive-force transmitting path between the secondary pulley 64 and the output shaft 30. However, this arrangement is not essential. It is possible to employ a modified arrangement in which, for example, the second clutch C2 is disposed in a drive-force transmitting path between the primary pulley 60 and the input shaft 22. In this modified arrangement, the secondary shaft 62 is connected integrally with the output shaft 30, and the primary shaft 58 is connected to the input shaft 22 through the second clutch C2.

In the above-described embodiment, the gear mechanism 28 is a gear mechanism which provides a single gear ratio that is higher than the highest gear ratio γmax of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Further, the gear mechanism 28 may be a gear mechanism that provides a gear ratio that is lower than the lowest gear ratio γmin of the continuously-variable transmission mechanism 24 and/or a gear ratio that is higher than the highest gear ratio γmax of the continuously-variable transmission mechanism 24.

In the above-described embodiment, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the target drive force Fwtgt that is calculated based on the running speed V and the accelerator operation amount θacc.

In the above-described embodiment, the torque converter 20 is used as fluid-operated drive-force transmitting device. However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided. In the above-described embodiment, the dog clutch D1 is provided in the first drive-force transmitting path PT1 through which the drive force is to be transmitted by the gear mechanism 28. However, the provision of the dog clutch D1 is not essential for carrying out the invention.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine (drive force source)
14: drive wheels
16: vehicle drive-force transmitting apparatus
22: input shaft (input rotary member)
24: continuously-variable transmission mechanism (belt-type continuously-variable transmission)
28: gear mechanism
30: output shaft (output rotary member)
46: hydraulic control unit
60: primary pulley
60c: hydraulic actuator 64: secondary pulley
64c: hydraulic actuator
66: transmission belt (transfer element)
88: accumulator
89: drive-pressure passage (hydraulic passage)
90: electronic control apparatus (control apparatus)
94: transmission shifting control portion
96: operation-state determining portion
B1: first brake (first engagement device)
C1: first clutch (first engagement device)
C2: second clutch (second engagement device)
PT1: first drive-force transmitting path
PT2: second drive-force transmitting path
PD: drive pressure (first hydraulic pressure)
Pc2: C2 clutch pressure (second hydraulic pressure)
SL2: C2 solenoid valve SL2 (electromagnetic valve)

What is claimed is:

1. A control apparatus for a vehicle that includes a drive force source, drive wheels, a drive-force transmitting apparatus and a hydraulic control unit,
wherein the drive-force transmitting apparatus includes:
an input rotary member to which a drive force is to be transmitted from the drive force source;
an output rotary member from which the drive force is to be outputted to the drive wheels;
a gear mechanism configured to provide at least one gear ratio;
a continuously-variable transmission mechanism;
a first engagement device; and
a second engagement device,
wherein the drive-force transmitting apparatus defines a plurality of drive-force transmitting paths that are provided in parallel with each other between the input rotary member and the output rotary member,
wherein the plurality of drive-force transmitting paths include a first drive-force transmitting path through which the drive force is to be transmitted by the gear mechanism when the first drive-force transmitting path is established by engagement of the first engagement device,
wherein the plurality of drive-force transmitting paths include a second drive-force transmitting path through which the drive force is to be transmitted by the continuously-variable transmission mechanism when the second drive-force transmitting path is established by engagement of the second engagement device,
wherein the hydraulic control unit includes:
an electromagnetic valve configured to regulate a first hydraulic pressure supplied to the electromagnetic valve via a hydraulic passage, such that the regulated first hydraulic pressure is supplied as a second hydraulic pressure from the electromagnetic valve toward the second engagement device, and
an accumulator connected to the hydraulic passage, so as to store the first hydraulic pressure that flows through the hydraulic passage, and
wherein said control apparatus comprises a transmission shifting control portion configured to calculate, based on a storage state of the first hydraulic pressure in the accumulator, an input torque inputted to the continuously-variable transmission mechanism when the second engagement device is in a releasing process state.

2. The control apparatus according to claim 1,
wherein the continuously-variable transmission mechanism includes (i) a primary pulley, (ii) a secondary pulley, (iii) a transfer element that is looped over the primary and secondary pulleys, (iv) a primary hydraulic actuator configured to apply, to the primary pulley, a primary thrust based on which the transfer element is to be clamped by the primary pulley, and (v) a secondary hydraulic actuator configured to apply, to the second primary pulley, a secondary thrust based on which the transfer element is to be clamped by the secondary pulley, and
wherein said control apparatus comprises a transmission shifting control portion configured to calculate a target value of the primary thrust and a target value of the secondary thrust, based on the input torque inputted to the continuously-variable transmission mechanism.

3. The control apparatus according to claim 2,
wherein the input torque inputted to the continuously-variable transmission mechanism is defined as (a) a first input torque, when being used in calculation of a thrust ratio which is a ratio of the secondary thrust to the primary thrust and which is for establishing a target gear ratio of the continuously-variable transmission mechanism, and
wherein the input torque inputted to the continuously-variable transmission mechanism is defined as (b) a second input torque, when being used in calculation of the primary and secondary thrusts required to prevent a slippage of the transfer element in the continuously-variable transmission mechanism.

4. The control apparatus according to claim 3,
wherein said transmission shifting control portion is configured to determine that the storage state of the first hydraulic pressure in the accumulator is a completely filled state in which the accumulator is substantially filled with the first hydraulic pressure, when an operation state of the second engagement device has been switched to the releasing process state from a fully engaged state,
wherein said transmission shifting control portion is configured, when the operation state of the second engagement device has been switched to the releasing process state from the fully engaged state, to select a smaller one of a first option value and a second option value, as the first input torque during the releasing process state of the second engagement device, in view of a switching point of time at which the operation state of the second engagement device has been switched to the releasing process state from the fully engaged state,
wherein the first option value is a converted value of an output torque of the drive force source, which is converted on the input rotary member, and
wherein the second option value is a value obtained by subtracting a converted value of a torque capacity reduction value, which is converted on the input rotary member, from a converted value of the output torque of the drive force source at the switching point of time, which is converted on the input rotary member, the torque capacity reduction value being a reduction of a torque-capacity command value of the second engagement device from said point of time.

5. The control apparatus according to claim 4,
wherein said transmission shifting control portion is configured, when the operation state of the second engagement device has been switched to the releasing process state from the fully engaged state, to select a largest one of a third option value, a fourth option value and a fifth option value, as the second input torque during the releasing process state of the second engagement device, wherein the third option value is the first input torque that is selected as the smaller one of the first option value and the second option value, wherein the fourth option value is the converted value of the output torque of the drive force source, which is converted on the input rotary member, and wherein the fifth option value is a converted value of a dragging torque of the second engagement device, which is converted on the input rotary member.

6. The control apparatus according to claim 3, wherein said transmission shifting control portion is configured to determine that the storage state of the first hydraulic pressure in the accumulator is an uncertain state in which it is uncertain whether the storage state is the completely filled state or not, when an operation state of the second engagement device has been switched to the releasing process state from an engaging process state, wherein said transmission shifting control portion is configured, when the operation state of the second engagement device has been switched to the releasing process state from the engaging process state, to select a smaller one of a sixth option value and a seventh option value, as the first input torque during the releasing process state of the second engagement device, wherein the sixth option value is a converted value of an output torque of the drive force source, which is converted on the input rotary member, and wherein the seventh option value is a converted value of a torque-capacity command value of the second engagement device, which is converted on the input rotary member.

7. The control apparatus according to claim 6, wherein said transmission shifting control portion is configured, when the operation state of the second engagement device has been switched to the releasing process state from the engaging process state, to select a largest one of an eighth option value, a ninth option value and a tenth option value, as the second input torque during the releasing process state of the second engagement device, wherein the eighth option value is the first input torque that is selected as the smaller one of the sixth option value and the seventh option value, wherein the ninth option value is the converted value of the output torque of the drive force source, which is converted on the input rotary member, and wherein the tenth option value is a converted value of a dragging torque of the second engagement device, which is converted on the input rotary member.

8. The control apparatus according to claim 1, further comprising:

an operation-state determining portion that is configured to determine that the operation state of the second engagement device has been switched to the releasing process state, if a transition-completion condition is satisfied when the second engagement device had been in the fully engaged state, wherein said transition-completion condition is that a rotational speed difference of the second engagement device is not smaller than a predetermined difference value with the hydraulic control being executed to release the second engagement device, wherein said operation-state determining portion is configured to determine that the operation state of the second engagement device has been switched to the releasing process state, if another transition-completion condition is satisfied when the second engagement device had been in the engaging process sate, and wherein said another transition-completion condition is that the hydraulic control is executed to release the second engagement device.

9. The control apparatus according to claim 1, wherein, when the operation state of the second engagement device has been switched to the releasing process state from a fully engaged state, said transmission shifting control portion is configured to obtain the output torque of the drive force source at a switching point of time at which at which the operation state of the second engagement device has been switched to the releasing process state from the fully engaged state, and to obtain an actual torque capacity value of the second engagement device at the switching point of time such that the obtained actual torque capacity value of the second engagement device is equal to a converted value of the obtained output torque of the drive force source, which is converted on a second-engagement-device rotary member on which the second engagement device is disposed.

10. The control apparatus according to claim 9, wherein, when the operation state of the second engagement device has been switched to the releasing process state from the fully engaged state, said transmission shifting control portion is configured to update the actual torque capacity value of the second engagement device during the releasing process state, such that an updated value of the actual torque capacity value is obtained by subtracting, from the obtained actual torque capacity value of the second engagement device at the switching point of time, a torque capacity reduction value that is a reduction of a torque-capacity command value of the second engagement device from the switching point of time.

11. The control apparatus according to claim 9, wherein, when the operation state of the second engagement device has been switched to the releasing process state from an engaging process state, said transmission shifting control portion is configured to obtain the actual torque capacity value of the second engagement device during the releasing process state such that the obtained actual torque capacity value of the second engagement device is equal to a torque-capacity command value of the second engagement device.

* * * * *